Dec. 6, 1938.   J. A. JOHNSON   2,138,923
APPARATUS FOR ASSEMBLING SEALING PADS IN RECEPTACLE CLOSURE CAPS
Filed March 24, 1937    10 Sheets-Sheet 1

INVENTOR.
J. A. JOHNSON
BY John A. Seifert
ATTORNEY.

Dec. 6, 1938.   J. A. JOHNSON   2,138,923
APPARATUS FOR ASSEMBLING SEALING PADS IN RECEPTACLE CLOSURE CAPS
Filed March 24, 1937   10 Sheets-Sheet 3

INVENTOR.
J. A. JOHNSON
BY John A. Seifert
ATTORNEY.

Dec. 6, 1938.    J. A. JOHNSON    2,138,923
APPARATUS FOR ASSEMBLING SEALING PADS IN RECEPTACLE CLOSURE CAPS
Filed March 24, 1937    10 Sheets-Sheet 4

INVENTOR.
J.A.JOHNSON
BY John A. Seifert
ATTORNEY.

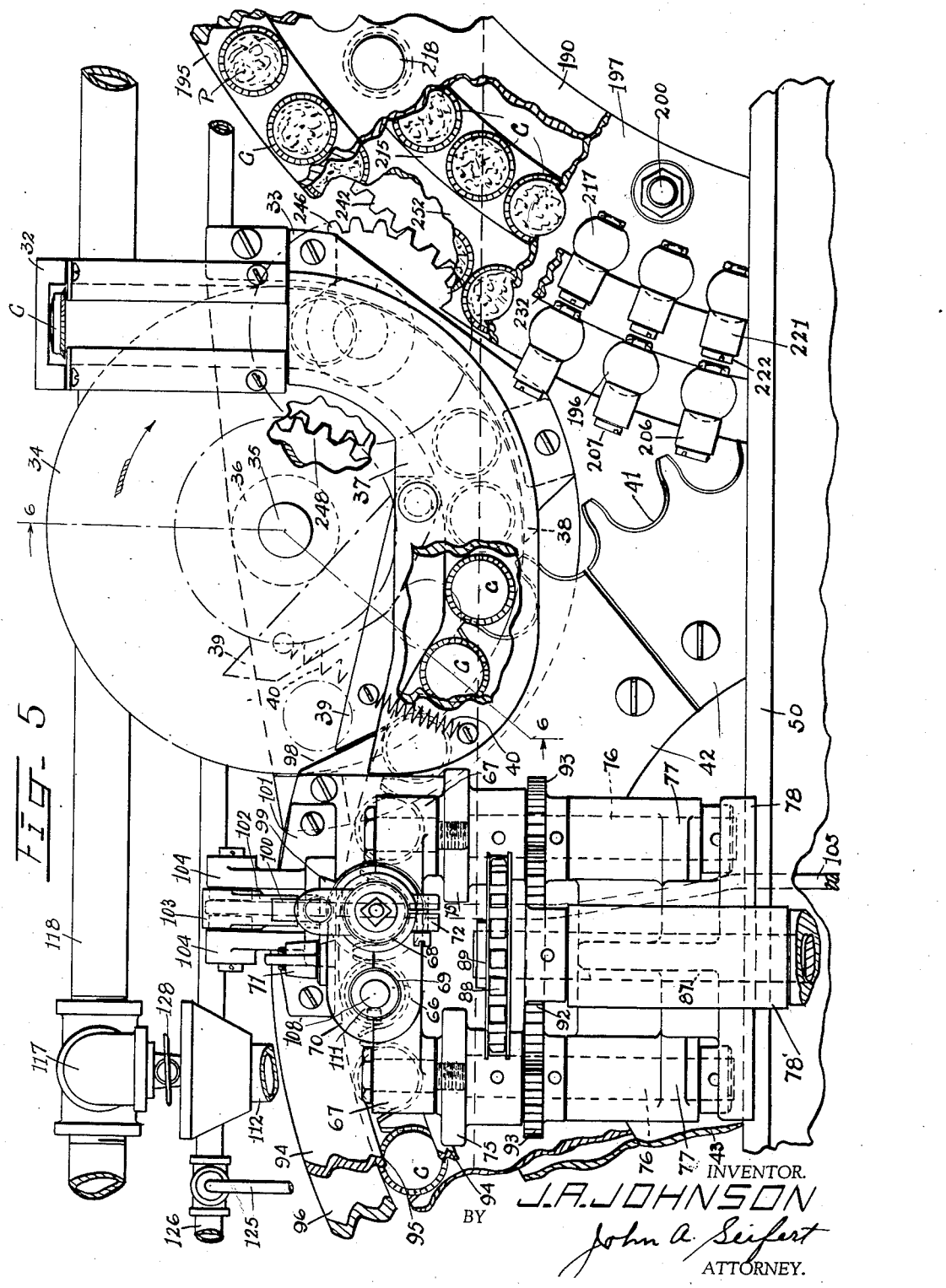

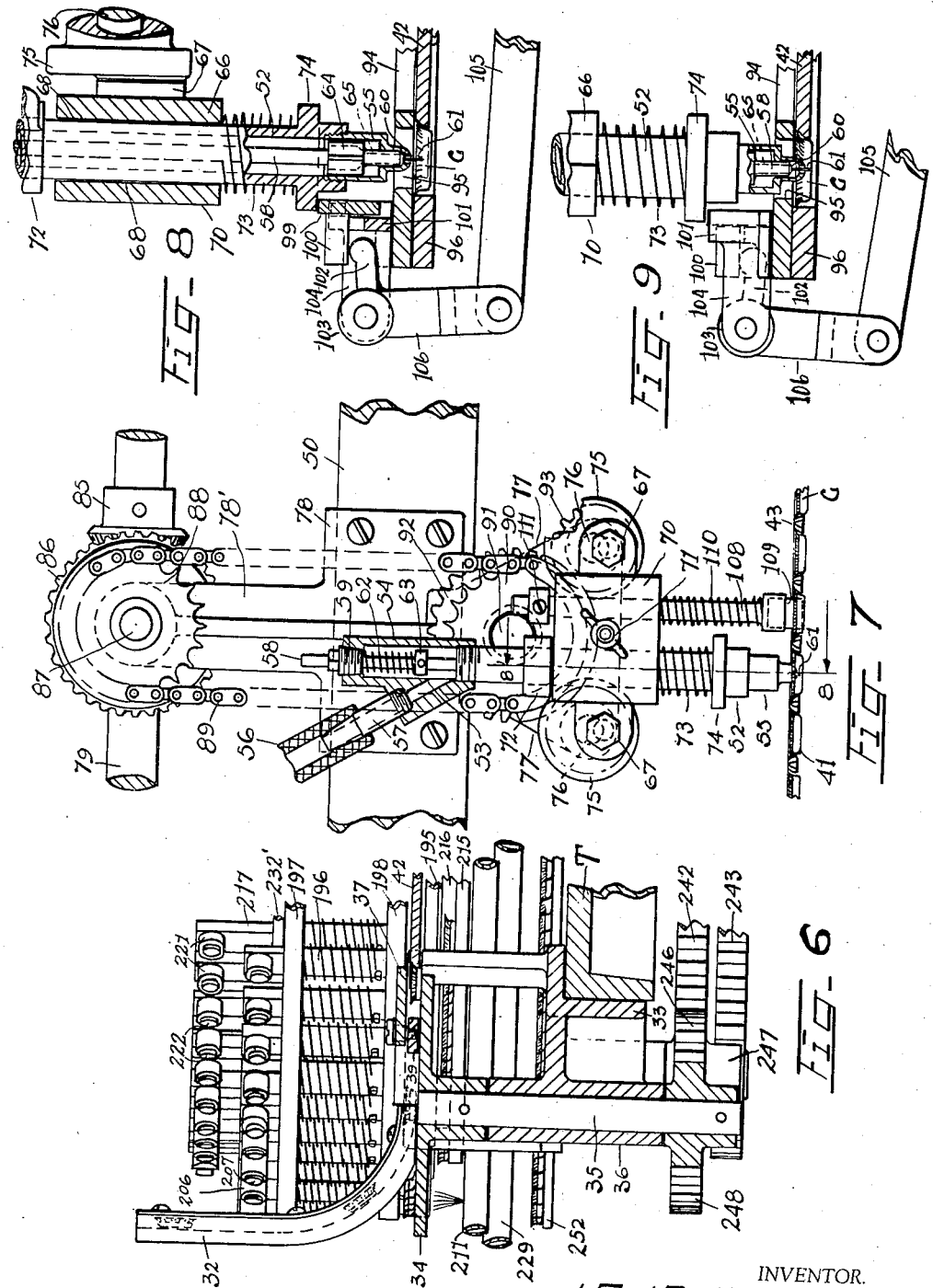

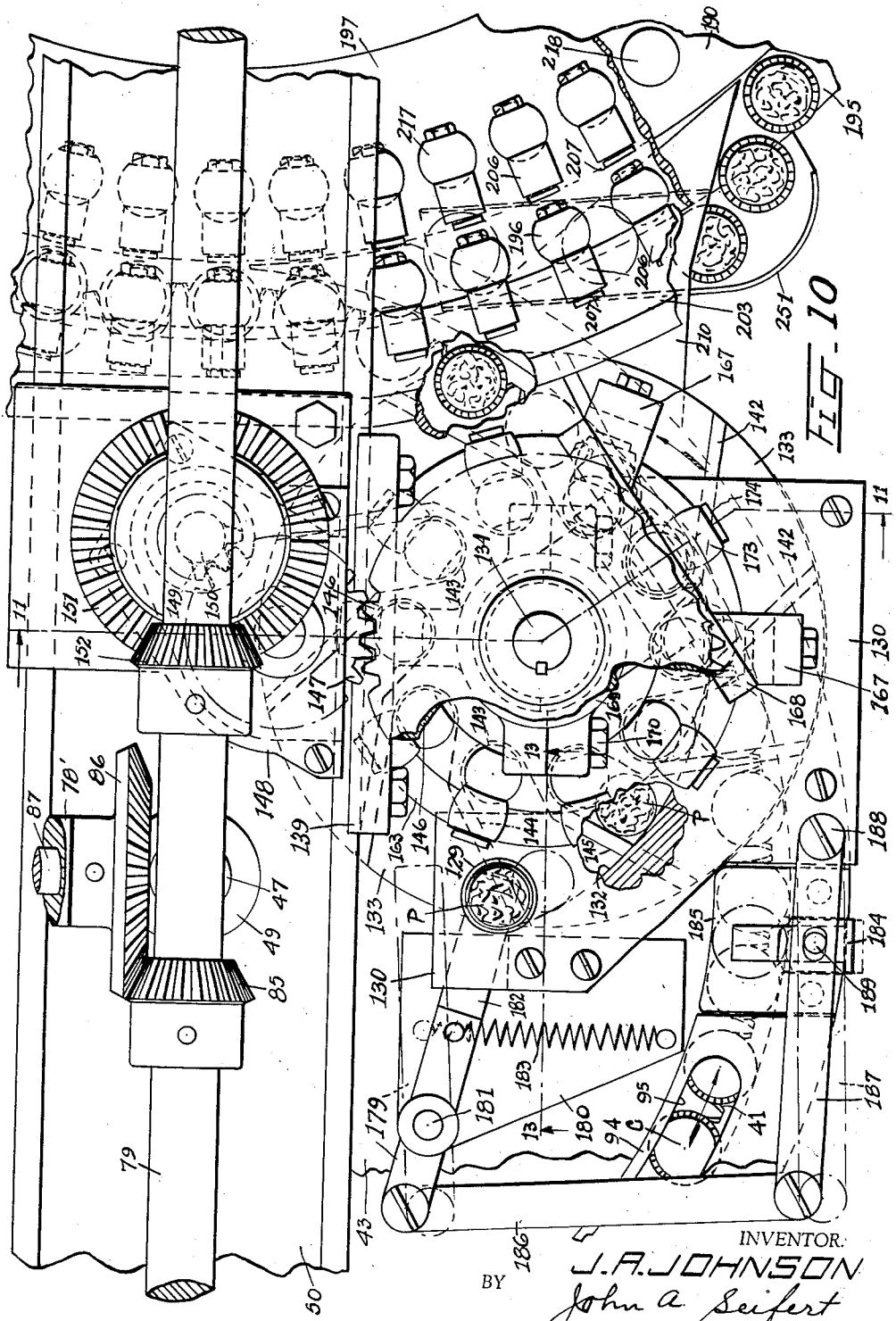

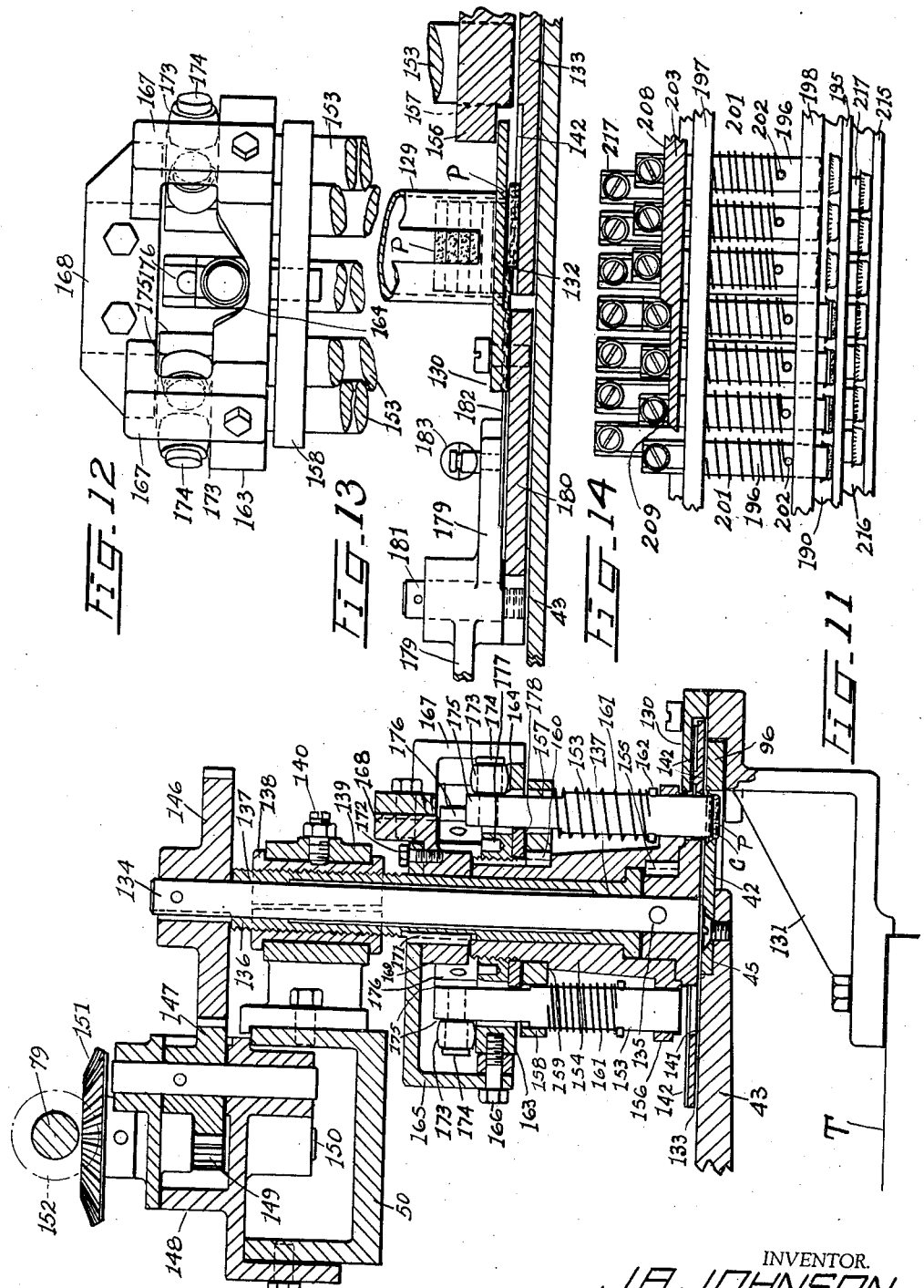

Dec. 6, 1938.    J. A. JOHNSON    2,138,923
APPARATUS FOR ASSEMBLING SEALING PADS IN RECEPTACLE CLOSURE CAPS
Filed March 24, 1937    10 Sheets-Sheet 9

INVENTOR.
J.A. JOHNSON
BY John A. Seifert
ATTORNEY.

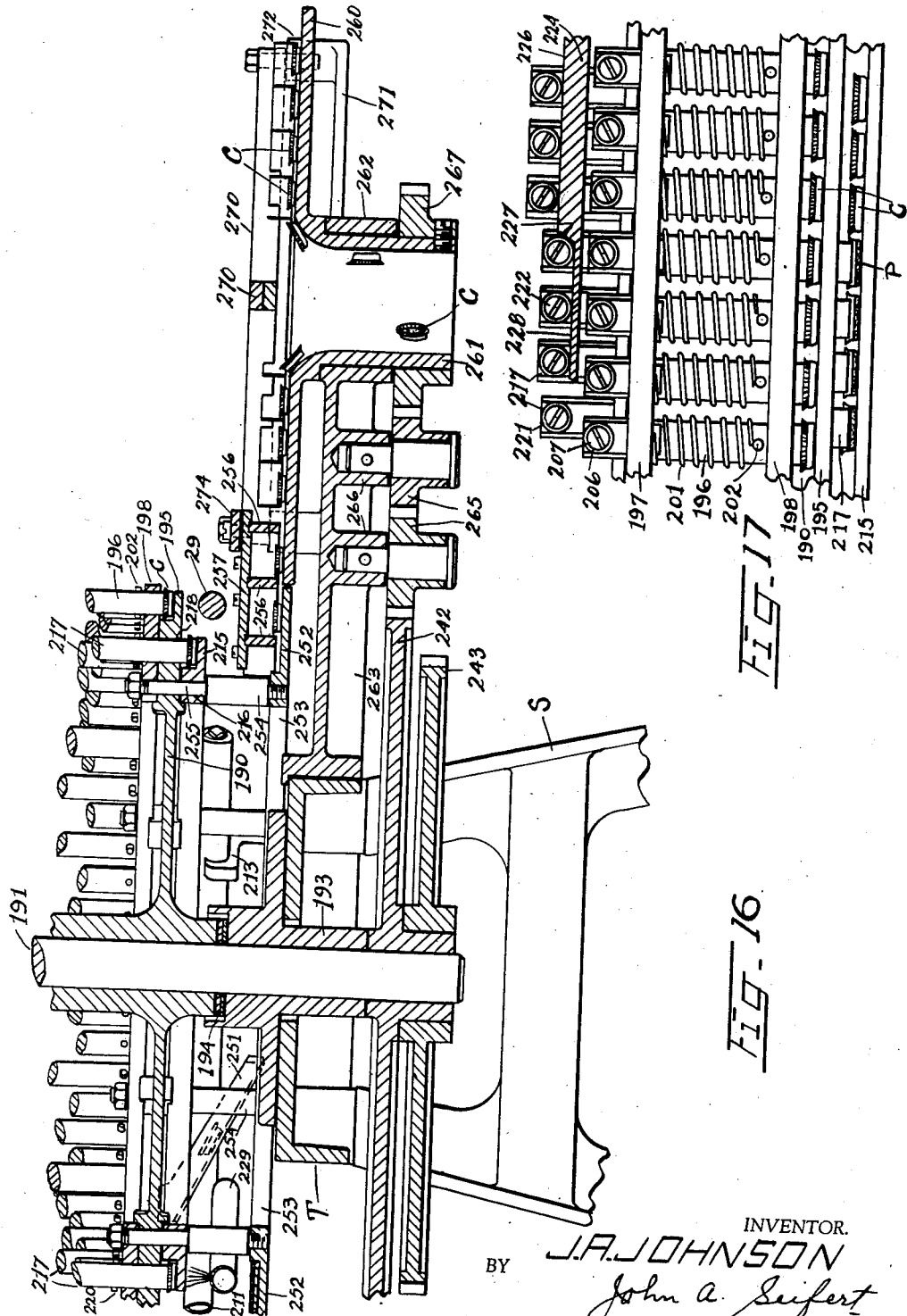

Patented Dec. 6, 1938

2,138,923

UNITED STATES PATENT OFFICE 2,138,923

APPARATUS FOR ASSEMBLING SEALING PADS IN RECEPTACLE CLOSURE CAPS

John A. Johnson, Woodhaven, N. Y.

Application March 24, 1937, Serial No. 132,728

21 Claims. (Cl. 113—80)

This invention relates to apparatus for assembling sealing pads in the form of disks of cork, cork compositions or other suitable material, such as paper, in receptacle closure caps, particularly of the type known as "crown caps", wherein the sealing pads are adhesively secured in the closure caps under heat and pressure, and it is the principal object of the invention to provide apparatus of this character which will assemble double the quantity of sealing pads in closure caps in a predetermined period of time than it is possible to assemble with the apparatus now in commercial use.

It is another object of the invention to provide apparatus for assembling sealing pads and the like in receptacle closure caps embodying a series of continuously traveling carriers for closure caps and each carrier having means associated therewith operative during the continuous travel of the carriers to feed closure caps to the carriers, deposit adhesive into the successive closure caps, heat the closure caps to render the adhesive viscous, and in successive sequence feed and assemble sealing pads in the closure caps, and the provision of unitary means traveling continuously relative to the carriers to receive closure caps having sealing pads assembled therein from the respective carriers and place the sealing pads under pressure to effect an intimate adhesive bond between the sealing pads and closure caps.

In the present commercial type of apparatus for assembling sealing pads in closure caps, it has been the common practice to deposit liquid adhesive in the closure caps by a nozzle of an adhesive carrying container movable toward and away from the closure caps and said nozzle being normally closed by a valve having a stem projecting from the nozzle adapted to engage a closure cap during the movement of the container toward said closure cap and open the nozzle thereby depositing adhesive in the closure cap. Should the apparatus be stopped with the nozzle valve projection in engagement with a closure cap and the valve in open position, the adhesive will continue to flow until the nozzle is moved away from the closure cap by placing the apparatus in operation or until the supply of adhesive is exhausted.

To overcome this disadvantage of the present use of the adhesive depositing means, it is another object of the invention to provide means actuated by the means controlling the operation of the apparatus to engage and move the nozzle in position away from the closure caps to permit the valve to close the nozzle when the means controlling the operation of the apparatus is actuated to stop the apparatus.

In the apparatus constituting the invention of the present application, the closure caps are transported past the discharge nozzle of an adhesive applying device continuously, and it is a further object of the invention to provide means to actuate the adhesive applying device in a continuous circular path to prevent the engagement of the nozzle thereof in a closure cap interrupting the continuous movement of the closure caps.

Another object of the invention is to arrange the driving connections of the different operating means of the apparatus to permit ready access to the same for the purposes of adjustment and replacement.

A further object of the invention is to provide means to feed closure caps to the apparatus having a minimum number of movable parts and which will prevent the closure caps jamming and injuring the carriers for the closure caps.

A still further object of the invention is to provide novel means for transferring sealing pads to a series of plungers for engaging the sealing pads in the closure caps which will reduce the number of movable parts and assure a positive feeding and assembling of the sealing pads in the closure caps without injuring the sealing pads.

It is a further object of the invention to provide a novel arrangement of pressure applying means to place the sealing pads under pressure in the closure caps to effect an intimate adhesion of the sealing pads to the closure caps which permits the doubling of the number of closure caps assembled within a predetermined time.

It is a further object of the invention to provide novel means for discharging assembled closure caps from the pressure applying means which will assure a continuous discharge of closure caps and which will not interrupt the continuous assembling of sealing pads in the closure caps.

It is still a further object of the invention to provide a single actuating means to prevent the depositing of adhesive in the closure caps and the heating of the closure caps, and stop the feeding of the closure caps and sealing pads.

Further objects and advantages of the invention will be more fully disclosed and pointed out hereinafter.

The embodiment of the invention illustrated in the accompanying drawings comprises a series of closure cap carriers consisting of a pair of continuously rotating tables having a series of seats for releasably supporting closure caps and adapted to position said seats successively relative to means to engage closure caps therein, means to deposit and spread adhesive in the closure caps supported in the seats, means to heat the closure caps and render the adhesive therein viscous, and means to feed sealing pads in vertical alinement with the closure caps having viscous adhesive therein and engage the sealing pads in the closure caps in contact with the viscous adhesive therein, and a double annular series of pressure applying plungers mounted to reciprocate relative to and movable with a pair of closure cap supporting shelves rotatable between the pair of closure cap supporting tables with a peripheral portion of one of said shelves extending below the closure caps having sealing pads therein supported in the seats of one of the pair of tables and a peripheral portion of the other shelf extending below the closure caps having sealing pads therein supported by the seats of the other table whereby the closure caps having sealing pads therein supported by both tables in superposed relation to the shelves are simultaneously moved from the tables to and retained on the shelves by the plungers and subsequently the sealing pads in said closure caps on the shelves are placed under pressure for the greater part of the revolution of the shelves by the plungers to effect an intimate adhesion between the sealing pads and closure caps and until the plungers are positioned from the closure caps when the closure caps having the intimately adhering sealing pads therein are positioned by the rotation of the shelves relative to abutments which remove and guide said closure caps from the shelves onto chutes leading to a shelf extending below and traveling with the pair of shelves adapted to receive and transfer the closure caps having intimately adhering sealing pads therein in a double row to a pair of channels extending from said shelf to a pair of cochleary channels superposed to a rotatable table having an axial discharge opening and mounted with a peripheral portion adjacent a peripheral portion of the shelf below the pair of channels to receive closure caps from said shelf. The pair of cochleary channels are adapted to guide the closure caps on said table toward the discharge opening thereof. The means to engage closure caps in the seats of the pair of rotating tables comprises a rotatable disk mounted adjacent a peripheral portion of each table of the pair of tables and rotating from a source of supply of closure caps toward the tables to convey the closure caps in a channel leading from the source of supply to the seats in the tables and relative to means to yieldingly urge the closure caps in the seats and permit the closure caps which have not been properly positioned in the seats to remain on the disk and be transported by the disk from the tables. The means to deposit and spread adhesive in the closure caps positioned in the seats comprises a carrier for a container for liquid adhesive having a discharge outlet at the lower end controlled by a valve normally positioned to close the outlet and adapted to be positioned to open the outlet by contacting a closure cap and a plunger spaced from the adhesive container to engage a closure cap having adhesive previously deposited therein by the container. The carrier for the container and plunger is positioned above the seats of each table of the pair of tables in sequence to the closure cap delivering disk relative to the rotation of the tables and actuated in a circular path toward and away from the closure caps in the seats whereby the depositing and spreading of the adhesive in the closure caps will not hinder the travel of the closure caps. Means are provided to engage the adhesive container and prevent the carrier from imparting movement toward the closure caps in the seats to the container when the rotation of the tables is stopped. The means to feed and engage sealing pads in the closure caps having viscous adhesive therein comprises a tube supporting sealing pads in stack formation with the lowermost sealing pad resting on a rotatable disk to be engaged by one of a series of ridges on the face of the disk and progressively moved by said ridge in conjunction with a cam face toward and in registry with an orifice of an annular series of orifices in the disk adapted to be positioned successively by the rotation of the disk in vertical alinement with the closure caps in the seats of each table of the pair of tables, and an annular series of spring influenced plungers traveling with the disk and mounted in alinement with and to have movement toward and away from the orifices of the disk and normally positioned away from the orifices to permit the positioning of the sealing pads in registry with the orifices and adapted to be permitted to move under the force of the springs into the orifices when the orifices are in vertical alinement with the closure caps in the table seats to engage and position the sealing pads in the closure caps with the pads in contact with the viscous adhesive therein. There are provided means to prevent feeding of sealing pads to position in vertical alinement with the closure caps comprising a pivoted lever having one end portion yieldingly urged to position between the lower end of the sealing pad supporting tube and the sealing pad feeding disk and the opposite end portion of the lever operatively connected to means projecting in the path of travel of the closure caps in the table seats and adapted to be actuated by the engagement of a closure cap with said projecting means to position the first mentioned end of the lever from its normal position between the tube and disk and permit the depositing of sealing pads by the disk.

In the drawings accompanying and forming a part of this application, Figure 1 is a view looking at the top of the apparatus forming the embodiment of this invention.

Figure 5 is a view looking at the top of a section of the apparatus showing the disk for feeding and engaging closure caps in the seats of a table of the pair of tables with the channel partly broken away to show the engagement of closure caps in the seats, the adhesive container and plunger, and a portion of the annular series of pressure applying plungers and the shelves with portions broken away to show closure caps on the pair of shelves and the shelf extending below the pair of shelves.

Figure 6 is a sectional view, on a reduced scale, taken substantially on the line 6—6 of Figure 5 looking in the direction of the arrows.

Figure 7 is an elevational view of the adhesive container and the plunger and showing means for imparting movement in a circular path to the carrier for the container and plunger toward and away from the closure cap carrying tables.

Figure 8 is a sectional view, on an enlarged scale, taken on the line 8—8 of Figure 7 looking in the direction of the arrows, and showing means engaging and preventing the adhesive container being moved toward the closure caps by the actuation of the carrier.

Figure 9 is a view similar to Figure 8 showing the adhesive container engaging means actuated to position out of engagement with the container to permit actuation of the container by the carrier toward the closure caps and depositing of adhesive therein.

Figure 10 is a view looking at the top of a portion of the apparatus including the disk for feeding sealing pads in vertical alinement with the closure caps in the table seats and the plungers for engaging the alined sealing pads in the closure caps, and showing the lever for preventing the feeding of sealing pads in the absence of closure caps in the seats in normal position between the sealing pad supporting tube and the disk, in full lines, and in dot and dash lines, in position to permit feeding of the sealing pads by the disk.

Figure 11 is a sectional view, on an reduced scale, taken on the line 11—11 of Figure 10 looking in the direction of the arrows, and showing a plunger engaging a sealing pad in a closure cap and the driving connection of the disk with a power shaft.

Figure 12 is a fragmentary view of the upper ends of the plungers for engaging sealing pads in the closure caps showing a cam arranged to permit the plungers to move toward and engage a sealing pad in a closure cap.

Figure 13 is a sectional view, on an enlarged scale, taken on the line 13—13 of Figure 10 looking in the direction of the arrows, and showing a sealing pad being engaged by a ridge of the sealing pad feeding disk and the cam face.

Figure 1:
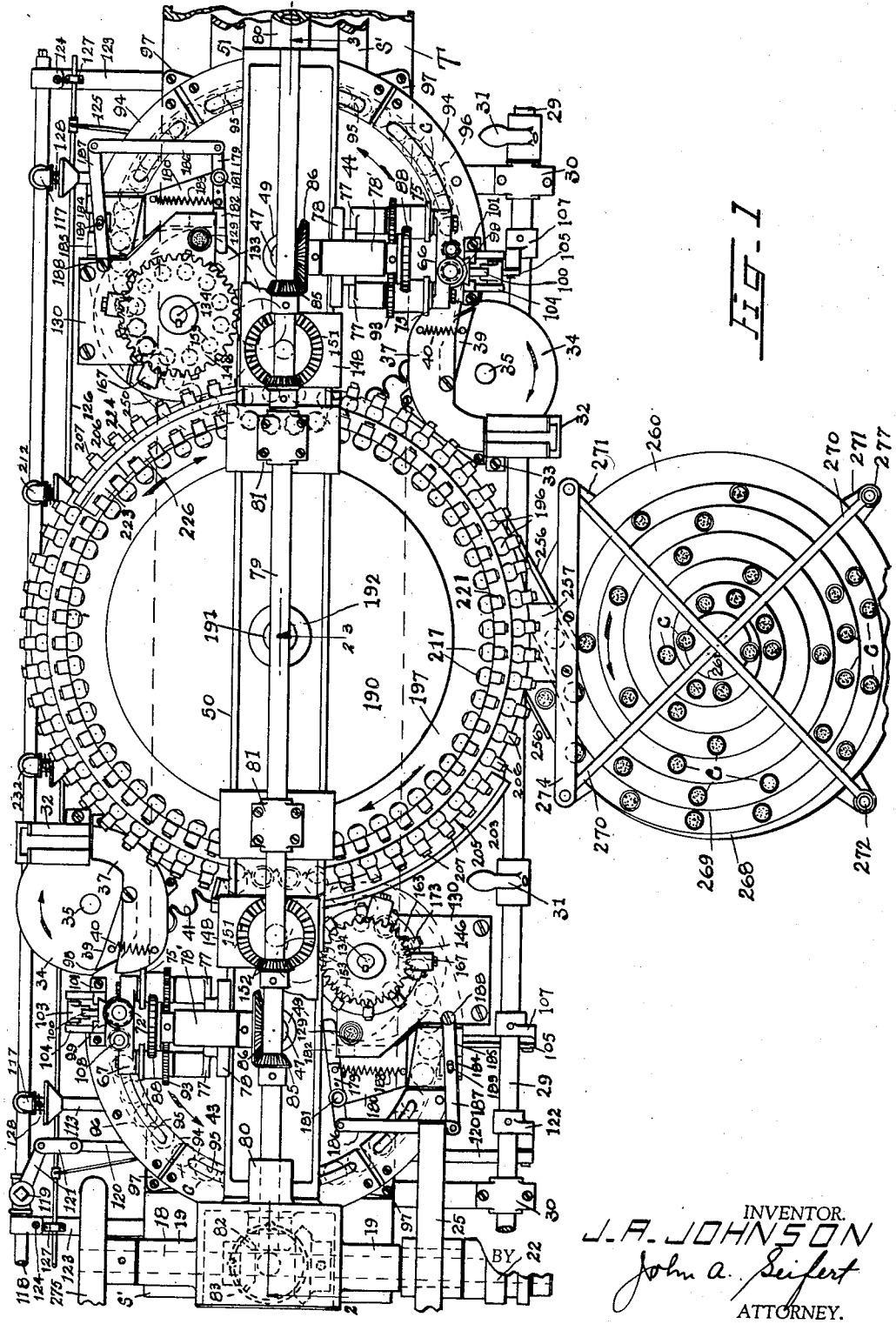

Figure 14 is a diagrammatic view of the portion of the double annular series of pressure plungers and pair of closure cap supporting shelves positioned to intersect the path of travel of the left hand closure cap supporting table, as shown in Figure 1, to show the progressive positions of the plungers mounted relative to the shelf extending below said left hand table wherein the plungers first engage the skirts of the closure caps to remove the closure caps from the table and subsequently engage the sealing pads under pressure to intimately unite the sealing pads to the closure caps.

Figure 15:
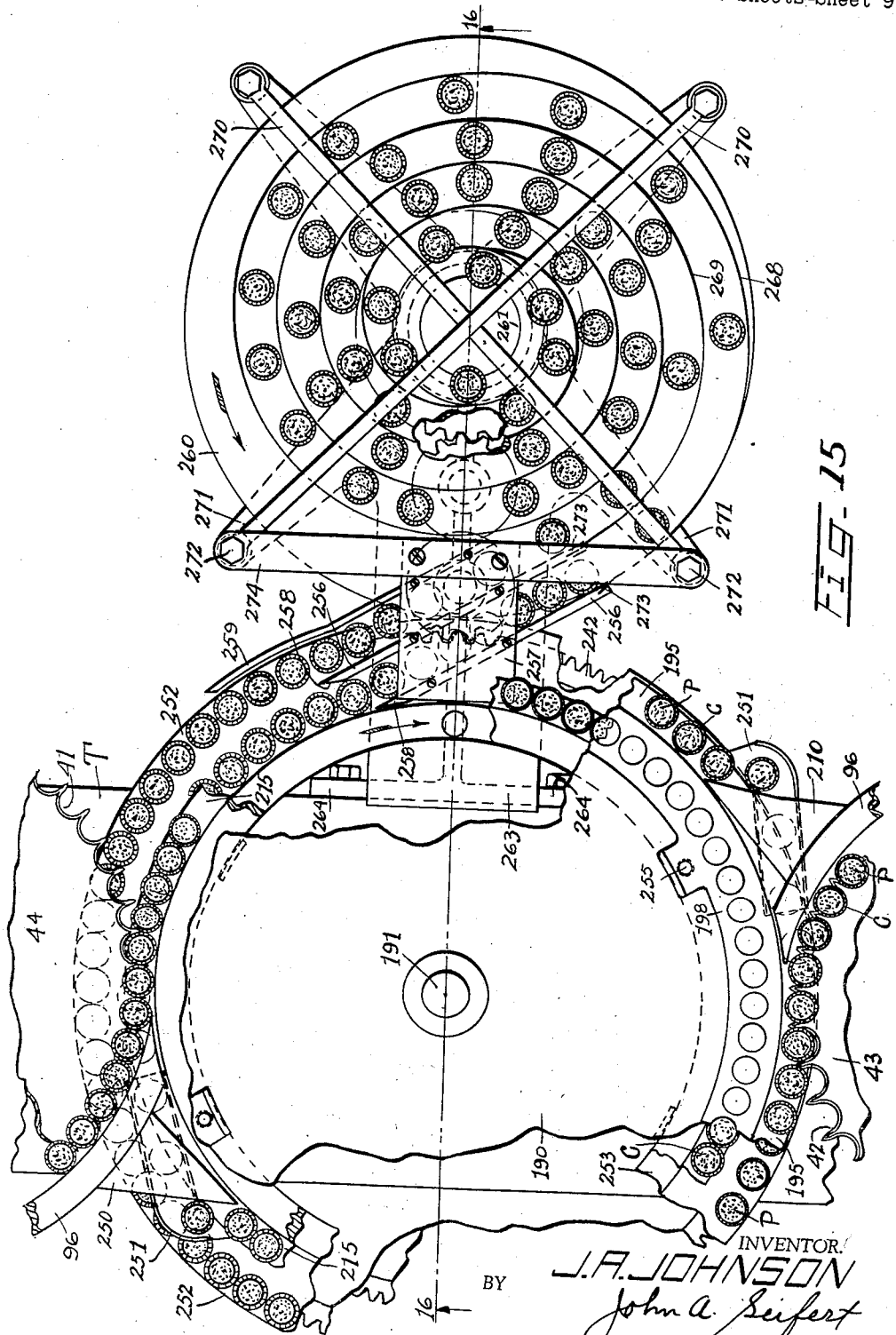

Figure 15 is a view looking at the top of a section of the apparatus embodying the pair of shelves for supporting closure caps relative to the pressure applying plungers, the shelf receiving closure caps having intimately adhering sealing pads from the pair of shelves, and the table for discharging the closure caps from the apparatus and permit of inspection of said closure caps, the pair of shelves being partially broken away to show the closure cap receiving shelf.

Figure 16 is a sectional view taken on the line 16—16 of Figure 15 looking in the direction of the arrows; and Figure 17 is a diagrammatic view similar to Figure 14 looking at the portion of the double annular series of pressure plungers and their respective shelves positioned adjacent the right hand closure cap supporting table, as shown in Figure 1, to show the progressive positions of the plungers mounted relative to the shelf extending below the right hand table.

In carrying out the embodiment of the invention illustrated in the accompanying drawings, the operative mechanisms are supported on an elongated table T mounted at the opposite ends on standards S, and said mechanisms are actuated by a drive shaft 18 rotatably mounted to extend transversely of the table in bearing bosses 19 arranged on a standard of a pair of standards S' on the table in superposed alinement with the standards S. On one end of the shaft 18 extending from a bearing boss 19, a pulley wheel 20 is loosely mounted adapted to be driven from a suitable source of power, such as an electric motor, not shown, by a belt 21, and operatively connected to the shaft 18 by a clutch, as indicated in a general way at 22, having a member slidable on and rotatable with the shaft and actuated into and out of position to connect the pulley wheel with the shaft by shifting mechanism comprising a lever 23 pivotally mounted at one end on a bracket 24 fixed to a guard shield 25 for the pulley wheel supported by the standard S', the lever having a pin and groove connection with the clutch member, as at 26 in Figure 4, adjacent said pivoted end, with the opposite end having a pin and slot connection, as at 27, with a link 28 fixed on an end portion of a shaft 29 extending longitudinally of the table T and rotatably supported in bearings arranged on brackets fixed to and extending laterally from a side of the table T, as at 30. The shifter lever may be actuated at different points along the length of the table T by hand grips or handles 31 fixed at convenient points on the shaft 29, as illustrated in Figure 1.

Closure caps C of the crown type having outwardly flaring skirt portions are delivered to the apparatus from a pair of hoppers or a hopper, not shown, but which may be of the type disclosed in my co-pending application Serial No. 114,950, filed December 9, 1936, by chutes 32 of the usual construction, as shown in Figures 1, 5 and 6, having the discharge ends supported by arcuately shaped supports 33 (Figures 5 and 6) mounted on the table T at diagonally opposite side portions thereof, as shown in Figure 1. The discharge ends of the chutes extend in a substantially horizontal plane over peripheral portions of a pair of disks 34 having a flat horizontal face and a hub portion extending from the opposite face fixed on one end of a shaft of a pair of shafts 35 rotatably mounted in a bearing boss 36 arranged in each of the supports 33 with the flat horizontal faces of the disks uppermost. The closure caps are continuously discharged from the chutes by the continuous rotation of the disks 34 in a direction away from the chutes, as indicated by the arrows in Figures 1 and 5, and guided in a single path along the periphery of the disks by an arcuate shaped plate 37 mounted on each of the supports in spaced parallel relation to the disks with one end abutting the discharge end of each chute 32 and of channel shape in cross section at said end portion thereof with a side wall of the channel extending around the periphery of the disks and of greater length than the other side wall of the channel, as at 38 in Figure 5. The closure caps are moved in the channel portions of the plates 37 away from the chutes 32 by the rotation of the disks 34 and when the closure caps leave said channel portions they are moved laterally from the disks by an arm 39 having a bow-shaped longitudinal edge and pivotally mounted at one end on the under face of each plate 37 adjacent the end of the shorter side wall of the channel portion to form a movable continuation of said side wall. The bow shaped edge is yieldingly urged in to the path of travel of the closure caps by a spring 40 fixed at one end to the upper face of the plate 37 and the other end fixed to the arm.

Figure 2:
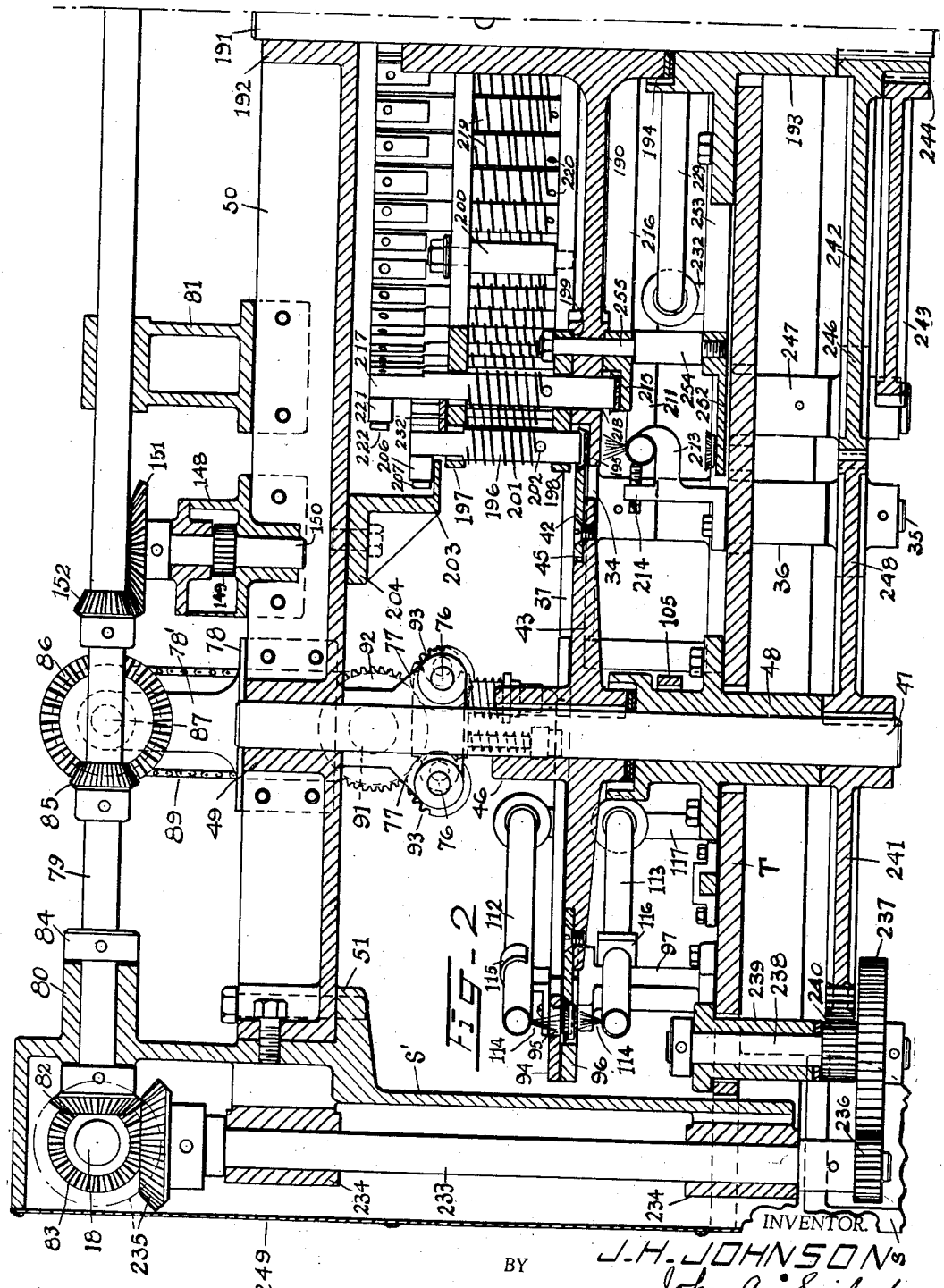
Figure 2 is a sectional view, on an enlarged scale, of the left hand half of the apparatus shown in Figure 1 taken on the line 2—2 of Figure 1 looking in the direction of the arrows.
Figure 3:
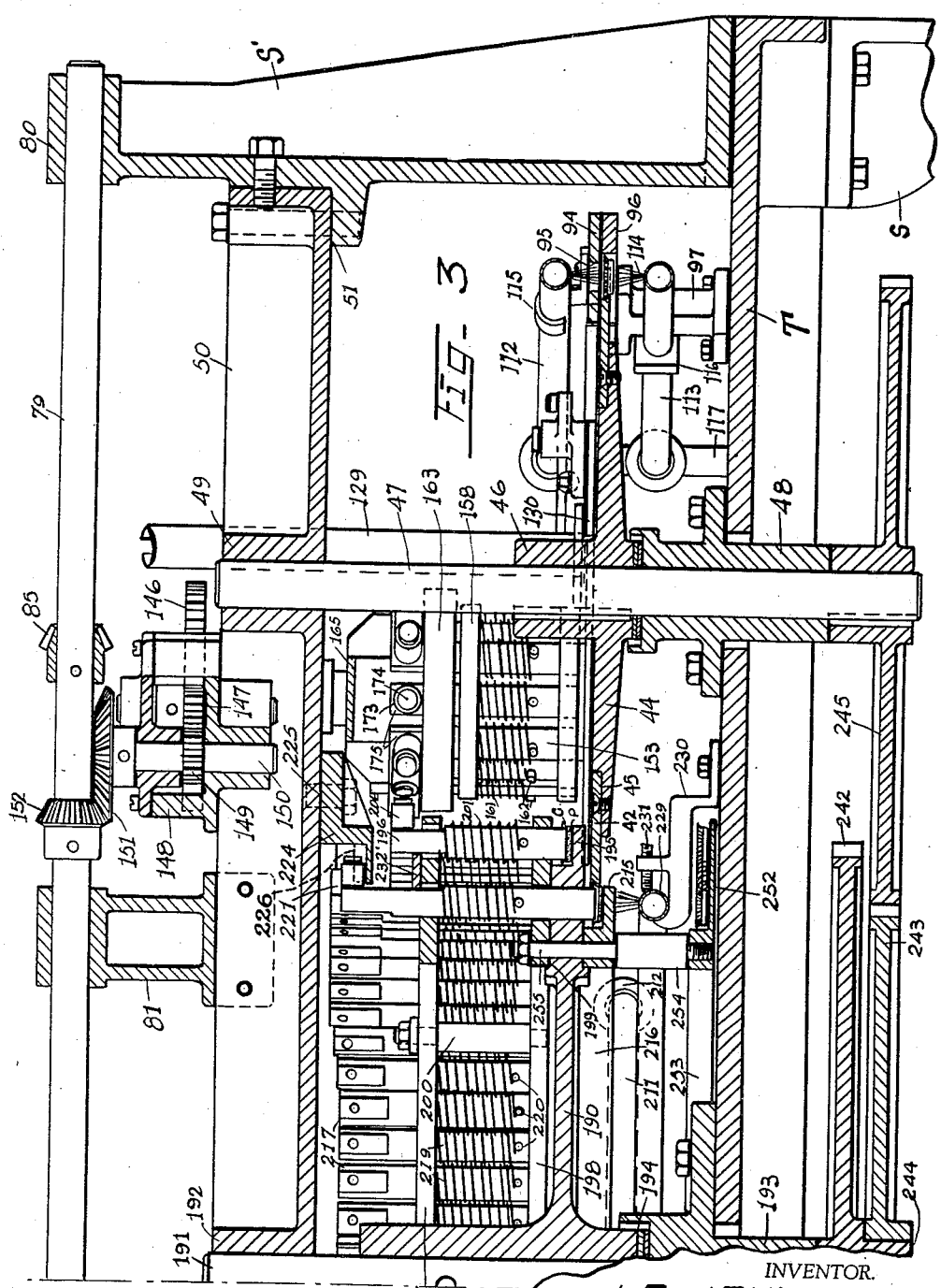
Figure 3 is a sectional view, on an enlarged scale, of the right hand half of the apparatus shown in Figure 1 taken on the line 3—3 of Figure 1 looking in the direction of the arrows.

The closure caps are moved by the arms 39 under the force of the springs 40 into supporting seats of continuously travelling closure cap carriers or conveyers comprising arcuate recesses 41 arranged in equidistantly spaced relation to each other in the periphery of arcuate segments 42, as shown in Figure 5, of a number to form two complete rings, or the segments may be in the form of annular members, mounted in a recess, as shown at 45 in Figures 2 and 3, in the peripheral portions of a pair of circular tables 43, 44 spaced apart longitudinally of the table T, as shown in Figure 1. In Figure 5, there is shown the manner in which the closure caps are prevented from jamming on the closure cap feeding disks 34 if they are not properly positioned to engage the arcuate recesses 41, by the improperly positioned closure caps, shown in dot and dash lines, forcing the arms 39 against the force of the springs 40 into the dot and dash line position, which will permit the jammed closure caps to be transported away from the recesses 41 by the rotation of the disks 34.

The tables or carriers 43, 44 are rotatably mounted so that a peripheral portion with the arcuate recesses 41 travels between the disks 34 and the plates 37, as shown in Figures 5 and 6, by arranging each table with a hub 46 adapted to be fixed on a shaft of a pair of shafts 47 rotatably mounted at the lower end portions in bearings 48 supported by the table T on the longitudinal axis thereof intermediate the supports 33 and the opposite ends of said table T, with the opposite ends of the shafts rotatable in bearing bosses 49 arranged on a beam 50 supported at the opposite ends on flanges extended inwardly from the standards S', as at 51 in Figures 2 and 3. The hubs 46 of the tables 43, 44 are supported upon the bearings 48, the surface of the bearing 48 engaged by the hub 46 of the table 43 extending upward from the table T further than the surface of the bearing 48 engaged by the hub 46 of the table 44, so that the table 43 will extend in a higher horizontal plane than the table 44 for a purpose to be hereinafter described. The discharge end of the chute 32, the disk 34 and plate 37 mounted relative to the table 44 will be nearer to the table T than the discharge end of the chute 32, the disk 34 and plate 37 mounted relative to the table 43, for the reason that the table 44 is nearer the table T than the table 43.

The closure caps C are retained in the seats 41 during the continuous travel of the tables 43, 44 by arcuate plate segments 94 having elongated openings 95 adjacent the inner edges thereof and mounted on arcuate shaped rails 96 extending along the peripheral portions of the plates 94 and supported by brackets 97 fixed to the upper surface of the table T to position the rails 96 to extend around the peripheries and in the planes of the tables 43, 44 to prevent movement of the closure caps from the seats 41 in a lateral direction and position the plates 94 above the seats 41 for the closure caps with the openings 95 exposing the interior of the closure caps and the portions of the plates 94 bordering the opposite sides of the openings extending over the flaring skirts of the closure caps to permit the applying of adhesive in the closure caps while at the same time preventing movement of the closure caps from the seats in an upward direction. An end of each of the arcuate shaped rails 96 forms an abutment to engage and limit the movement of the arms 39 toward the seats 41, as at 98 in Figures 1 and 5.

Figure 4:
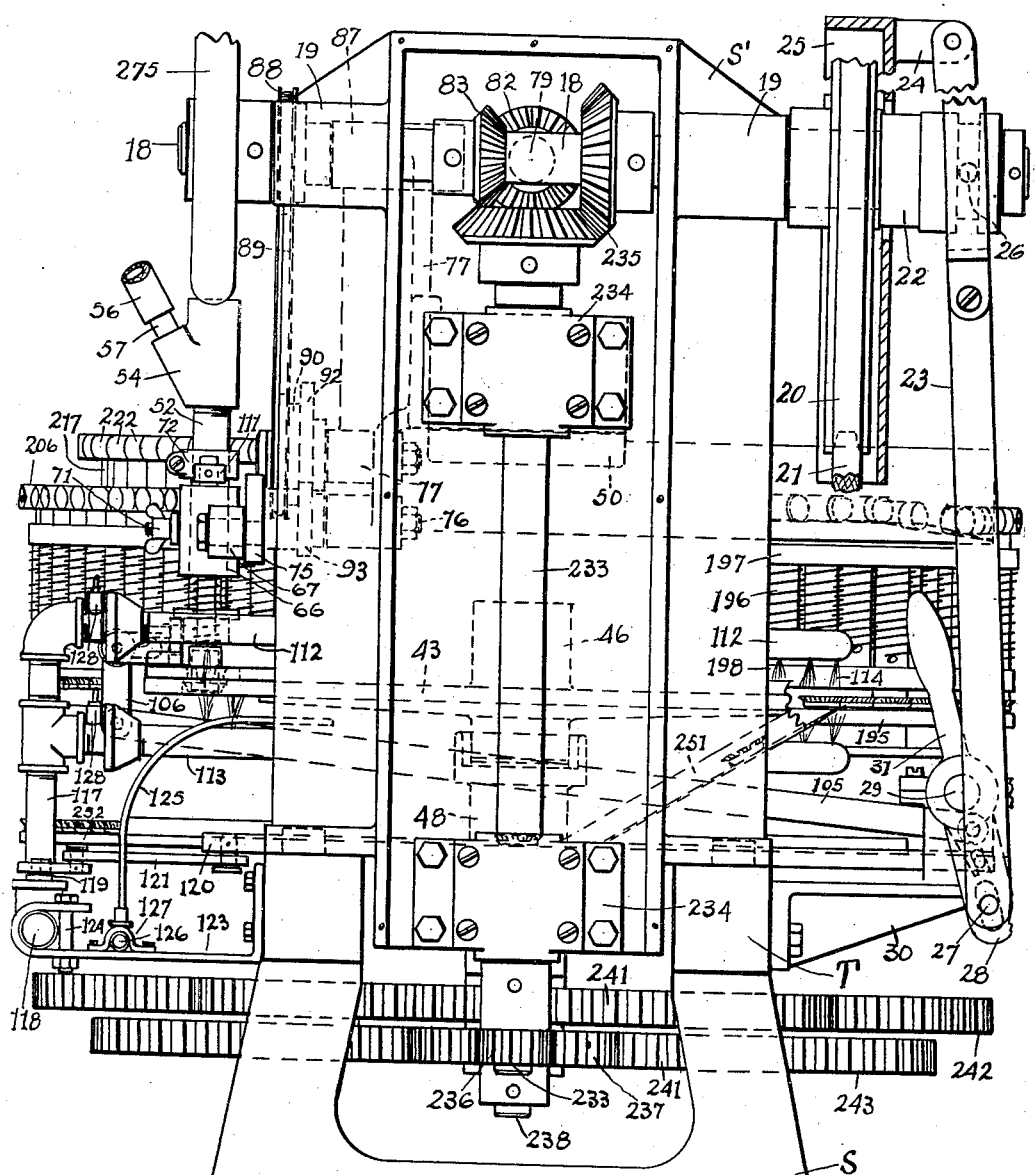
Figure 4 is an elevational view, on an enlarged scale, of an end portion of the apparatus looking at the left of Figure 1.

The closure caps C positioned in the seats 41 of the tables 43, 44 are conveyed by the rotation of said tables from the disks 34 past means disposed above and relative to the travel of the closure caps to deposit and spread liquid adhesive in said closure caps during the continuous travel of the tables, comprising (Figures 1, 4, 5, 7, 8 and 9) a pair of tubular containers 52, each container having an inlet opening 53 for supplying adhesive to the containers through a coupling member 54 secured to one end of the container and an outlet opening for the discharge of adhesive from the container through a nozzle member 55 arranged with a restricted discharge orifice removably mounted in the opposite end of the container. The adhesive is delivered to the containers 52 from a source of supply, not shown, through a flexible conduit 56 connected to the inlet opening 53 by a nipple 57, as shown in Figures 4 and 7. The discharge of adhesive through the nozzle 55 is controlled by a valve in the form of a rod or stem 58 of greater length than the container 52 and slidably supported at the opposite ends in a plug screw threaded into an opening in the closed end of a portion of the coupling member 54 axially of the container, as at 49, and in the restricted portion of the nozzle 55. The end of the rod supported in the nozzle is of conical shape to engage the wall about and close the discharge orifice of the nozzle, as at 60 in Figures 8 and 9, and has a needle projection 61 adapted to extend through the discharge orifice. The conical end 60 of the valve is yieldingly positioned to normally close the discharge orifice by a spring 62 coiled around the rod and confined between the plug 59 and a collar 63 fixed on the rod at a point above the inlet opening 53 in the nozzle closing position of the valve to prevent accumulation of adhesive on the spring, which would affect the action of the spring. To facilitate the sliding movement of the rod valve 58 it is maintained in alinement with the supports therefor by an enlarged portion on the rod adjacent the conical end 60 of less diameter than the inner diameter of the nozzle 55, the enlarged portion having radially extending vanes to engage the inner wall of the nozzle 55, as at 64 in Figure 8. The lower end of the rod valve 58 is arranged with longitudinal grooves extending from the guide 64 to the conical end, as indicated in dotted lines at 65 in Figures 8 and 9 to permit the flow of adhesive to the discharge orifice. Each of the containers 52 are slidably mounted in a carrier comprising a member 66 (Figures 7 and 8) having perforated ears 67 extended from the opposite ends thereof and a pair of semicircular recesses 68, 69 (Figure 5) in a face thereof, the recess 68 having a greater radius than the recess 69 and slightly greater than the radius of the containers 52, and a clamping plate 70 having recesses in a face thereof corresponding to the recesses 68, 69 and releasably mounted on the member 66 by a stud fixed in and extending from said member 66 and through an opening in the plate 70 and a wing nut engaged on the end of the stud extending from the plate 70, as at 71. The corresponding recesses 68 in the member 66 and plate 70 form a circular slideway for the containers 52 which are retained in said slideways by a split collar 72 clamped on each container above the member 66 and plate 70 and adapted to abut said member and plate under the force of a spring 73 coiled around each container and confined between the member 66 and plate 70 and an exterior shoulder 74 arranged on each container above the nozzles 55. By this arrangement of parts, longitudinal movement may be imparted to the containers independently of the carriers 66, 70 therefor, and the needle projections 61 are yieldingly engaged with and moved by the closure caps traveling past the containers 52 by the downward movement of the carriers 66, 70 being imparted to the containers through the springs 73. To impart movement to the containers 52 toward and away from and deposit adhesive in closure caps without affecting the continuous travel of the tables 43, 44, a continuous circular movement is imparted to the carriers 66, 70 in the direction of travel of the tables 43, 44 by pivotally connecting the ears 67 of the carrier members 66 eccentrically of pairs of wheels 75, with each wheel of a pair of wheels rotatably mounted in horizontally spaced relation to the other wheel of said pair of wheels by fixing the wheels on a stud shaft 76 rotatably mounted in diverging extensions 77 of a pair of brackets 78. The brackets 78 are mounted on opposite sides of the beam 50, each of the brackets being in line with a shaft 47, as shown in Figure 1. The wheels 75 are rotated continuously from the drive shaft 18 through a shaft 79 rotatably mounted at the opposite end portions in bearings arranged on the standards S', as at 80 in Figures 1, 2 and 3, and at intermediate portions thereof in bearings 81 mounted on the beam 50. The shaft 79 is operatively connected to the drive shaft 18 through a bevelled pinion 82 fixed on an end of the shaft 79 meshing with a bevelled pinion 83 fixed on the drive shaft 18, as shown in Figures 1, 2 and 4, and the shaft 79 is retained against longitudinal movement by the hub of the pinion 82 abutting one side of a bearing 80 and a collar 84 fixed on the shaft 79 abutting the opposite side of said bearing, as shown in Figure 2. The rotation of the shaft 79 is imparted to the wheels 75 by bevelled pinions 85 fixed on the shaft adjacent the opposite ends and each pinion meshing with a bevelled gear 86 fixed on a shaft 87 rotatably mounted in a bearing of a vertical extension 78' of the brackets 78 (Figure 2) and the opposite end of each of said shafts 87 carrying a sprocket wheel 88 operatively connected to a wheel 90 fixed on a stud shaft 91 rotatably mounted in a bearing at the fork of the diverging extensions 77 by a sprocket chain 89 engaged around the sprocket wheels 88, 90. Each shaft 91 carries a gear 92 adjacent the sprocket wheel 90 meshing with a pair of gears 93 fixed on the stud shafts 76 of the wheels 75, so that the continuous rotation of the shaft 79 is imparted to the wheels 75 and circular movement is imparted to the carriers 66, 70 to momentarily move the rod valves 58 to open position by a rapid engagement of the projections 61 with the closure caps.

The stopping of the operation of the apparatus by the actuation of the clutch by a hand grip 31 to disconnect the driving pulley 20 from the drive shaft 18 may occur when the carriers 66, 70 are in their lowermost position with the valve projections 61 engaging the closure caps and unseating the valve faces 60 from the discharge orifices which will permit the discharge of adhesive until the supply of adhesive is exhausted or until the apparatus is placed in operation to position the needle projections 61 out of contact with the closure caps, as shown in Figure 8. To prevent this waste of adhesive and the consequent cluttering of the closure cap supporting seats 41 with adhesive, there are provided means to move and maintain the containers 52 in elevated position against the force of the springs 73 and the downward movement of the carriers 66, 70, comprising a pair of slide blocks 99 with each block having a projection 100 extending laterally from a face thereof and slidably mounted in a slideway arranged in a face of a bracket 101 mounted on the peripheral portion of a segment of each guide plate 94 in line with the longitudinal axes of the adhesive containers 52 to permit the engagement of the blocks 99 below the exterior shoulders 74 of said containers. The projections 100 extend through a slot in the brackets 101 for the engagement of a finger 102 fixed to and extending from a boss 103 of a lever 106 pivotally mounted between leg portions 104 extending from the outer face of each bracket 101. The fingers 102 are actuated to engage the projections 100 and lift the blocks 99 into engagement with the shoulders 74 and move the containers 52 to position the needle projections 61 out of engagement with the closure caps by the hand grips 31 through links 105 pivotally connected at one end to the bifurcated ends of the levers 106 which extends at approximately right angles to the fingers 102. The other ends of the links 105 are pivotally connected to arms fixed on the shaft 29 in line with the brackets 101. It is to be noted that the link 105 mounted relative to the adhesive depositing means for table 43 extends transversely of the table T and the arm 107 associated with said link extends downwardly from the shaft 29, whereas the link 105 connecting the adhesive depositing means for table 44 extends to the adjacent peripheral portion of said table due to the position of the adhesive applying means for table 43 being on the side of the table T remote from the shaft 29 and the adhesive applying means for the table 44 being on the side of said table T adjacent the shaft 29, and the arm 107 associated with the link 105 positioned relative to the table 44 extends upwardly from the shaft 29 due to the different horizontal positions of the tables 43 and 44. The arms 107 are positioned on the shaft 29 to actuate the fingers 102 to permit the slide blocks 99 to drop to the plates 94 under the force of gravity and the downward movement of the containers 52, as shown in Figure 9, when the shaft 29 is positioned to actuate the clutch member 22 in position to couple the driving pulley 20 with the drive shaft 18, and actuate the fingers 102 to lift the slide blocks 99 to move and maintain the containers 52 in position with the needle projections 61 spaced from the closure caps, as shown in Figure 8, when the shaft 29 is actuated to disengage the driving pulley 20 from the drive shaft 18. The movement of the containers 52 in an upward direction by the fingers 102 regardless of the position of the carriers 66, 70 is possible due to the slidable mounting of the containers in said carriers.

The engagement of the valve projections 61 with closure caps and thereby the subsequent opening of the nozzles 55 will deposit a spot of adhesive in each closure cap and it is desirable to spread said spot of adhesive to form a thin even layer over the bottom of the closure cap to uniformly unite an entire surface of sealing pads to the closure caps. This purpose is accomplished by spreaders or daubers comprising a plunger 108 slidably mounted in the circular bore formed by the semi-circular recesses 69 in the member 66 and plate 70 of each carrier for the adhesive containers 52, the lower end of each plunger being arranged of cup shape and having mounted therein a head of resilient material, such as rubber, as at 109 in Figure 7. The end of the plunger with the spreader heads 109 are yieldingly urged outwardly from the carriers 66, 70 by a spring 110 coiled around each plunger between the bottoms of the carriers and the heads, and the plungers are retained in said carriers by a collar 111 fixed to a portion of each plunger extending above the carriers. The heads 109 are engaged in closure caps successively to the depositing therein of a spot of adhesive by the circular downward movement of the carriers imparted to the plungers through the springs 110.

Subsequent to the depositing and spreading of adhesive in the closure caps in the seats 41 of the tables 43, 44, said closure caps are passed through a zone of elevated temperature to render the adhesive in said closure caps viscous created by heating elements extending above and below the travel of the closure caps of any suitable form and structure and which may comprise a series of longitudinal gas burners formed by pairs of pipes 112, 113 having portions extending in an arcuate direction, with the pipes 112 of each pair of pipes in a plane above the seats 41 of the tables 43, 44 and the pipes 113 of each pair of pipes in a plane below the seats of said tables, as shown in Figures 2 and 3. The pipes are arranged with a series of orifices opposed to the seats 41 to direct the gas flames toward the tops and bottoms of the closure caps, as at 114 in Figures 2 and 3, to destroy foreign substances in the adhesive and render the adhesive viscous. The pipes 112 are supported above the seats 41 by brackets mounted on the plates 94 having an arcuate portion embracing the upper half of said pipes, as at 115, and the pipes 113 are supported below the seats 41 by bifurcated members 116 engaging said pipes and mounted at the ends of the bifurcations on the brackets 97, as shown in Figures 2 and 3. The burner pipes 112, 113 are connected in communication with vertical leads 117 of a gas supply pipe 118. The supply of gas to the burner pipes 112, 113 is controlled by a valve in the supply pipe 118, as indicated in a general way at 119 in Figure 1, actuated by the hand grips 31 through a rod 120 connected at one end to the valve by links 121 and the opposite end of the rod pivotally connected to an arm 122 fixed on the shaft 29, whereby the disconnecting of the driving pulley 20 from the drive shaft 18 will shut off the gas supply from the burner pipes 112, 113. The gas supply pipe 118 extends for the length of the table T and is supported thereby by brackets 123 fixed at one end to a side of the table T with the opposite ends bent over the pipe 118 and secured in such position by bolts engaged in opposite parts of the brackets to extend transversely of the pipe 118, as at 124 in Figure 4. The gas is automatically ignited at the burner orifices of the pipes 112, 113, when the valve 119 is opened by the actuation of the handles 31 by a pilot light supplied by pipes 125 having outlet ends terminating adjacent the burner orifices, as shown in Figure 4, with the other ends connected in communication with a supply pipe 126 extending the length of the table T and supported by and secured to the brackets 123 by clamps embracing the pipes and fixed at the opposite ends to the brackets, as at 127. The supply of gas may be individually regulated to each of the burner pipes 112, 113 by manually operated valves interposed in the connection between said pipes and the vertical leads 117, as indicated at 128.

The burner pipes 112, 113 extend from a point in the travel of the closure caps subsequent to the adhesive spreader plungers to a point preceding means for assembling sealing pads P in the closure caps so that the adhesive in said closure caps is rendered fully viscous and tacky to assure an adhesion between the sealing pads and closure caps when the sealing pads are engaged in the closure caps in contact with the adhesive therein.

The sealing pads are of resilient material, such as composition cork, cork or paper, formed to disk shape and supported in stack formation adjacent the travel of the closure caps in the seats 41 of the tables 43, 44 by a pair of tubes 129 of slightly greater diameter than the sealing pads leading from a hopper, not shown, and supported at the lower ends in an opening in a pair of plates 130 mounted at marginal portions on brackets 131 (Figure 11) fixed to diagonally opposite side portions of the table T, the table 130 for supporting the tube 129 supplying sealing pads to the closure caps supported and transported by the table 43 being substantially opposite the disk 34 for feeding closure caps to said table 43, and the plate for supporting the tube supplying sealing pads to the closure caps supported and transported by the table 44 being substantially opposite the disk 34 for feeding closure caps to said table 44. The under face of each of the plates 130 extends in spaced parallel relation to the tables 43, 44 and is arranged with a ridge 132 extending in an arcuate direction formed by undercutting the portions of the plates extending from the tubes 129 to intermediate portions adjacent the opposite ends of the plates so that the plates will be of two thicknesses, as clearly shown in Figure 13. The openings in the plates 130 for the mounting of the tubes 129 are located at an end portion of each plate and the ridges 132 extend from said openings to the opposite ends of the plates, as indicated in dotted lines in Figure 10. The lowermost sealing pad in each of the tubes 129 is supported by a disk of a pair of disks 133 rotatably mounted to extend above the tables 43, 44 with peripheral portions extending between said tables and the plates 130 by shafts 134 fixed at one end in a hub portion of each disk, as at 135 in Figure 11, and the shafts extended through and rotatable in elongated sleeves or tubular members 136 having interior bearing surfaces at the opposite ends, as at 137, for supporting the shafts 134. The sleeves 136 are adjustably carried by split collars 138 threaded onto the sleeves and supported in bosses of brackets 139 mounted on diagonally opposite sides of the beam 50, the collars being clamped to the sleeves by set screws 140 adjustably engaged in the bosses, as shown in Figure 11, to prevent rotation of the collars and sleeves. The adjustable mounting of the sleeves 136 in the collars 138 permits positioning of the disks 133 different distances from the tables 43, 44. Each of the disks 133 is arranged with an annular series of orifices 141 tapering from the upper to the lower faces of the disk and equidistantly spaced from each other around and adjacent to the hub of the disk, and a series of ribs 142 projecting from the upper face of the disk with each rib extending from the hub along peripheral portions of adjacent orifices and then tangentially from one of said orifices to the periphery of the disk so that each orifice has a recess extending around the portion of the circumference adjacent the hub of the disk, as at 143 in Figure 10, and having parallel walls extending tangentially from diametrically opposite portions of said orifice, as shown in dotted lines at 144 with one of said walls diverging from the other wall at a point intermediate the orifice and periphery of the disk, as at 145. The lowermost sealing pad in each tube is engaged by a rib 142 at the outer end portion thereof through the rotation of each disk 133 and is moved by said rib along the ridge 132 and by the continued rotation of the disk the sealing pad is moved progressively along the rib 142 toward an orifice and is positioned in registry with said orifice by the recess portions 143 and 144. The plates 130 are spaced a distance above the disks 133 to have the undercut portions of the plates extend a slight distance from the sealing pads on the disks to permit movement of the sealing pads in horizontal planes and maintain said sealing pads in flat condition, and so that the upper halves of the sealing pads are engaged by the ridge 132 and the lower halves of the sealing pads are engaged by the ribs 142, as shown in Figure 13. The shafts 134 are mounted relative to the tables 43, 44 to position the orifices 141 in the disks 133 successively in vertical alinement with successive closure cap supporting seats 41 in the tables 43, 44 at points in the travel of said seats on opposite sides of the longitudinal axis of the table T, and the ridges 132 extend in an arcuate path eccentrically of the shafts 134 and progressively leading toward a point slightly in advance of the point in the travel of the orifices where said orifices are in vertical alinement with the closure cap supporting seats, as shown in Figure 10, at which latter point the sealing pads are in full registry with the orifices, so that the sealing pads will be positioned in registry with the orifices 141 prior to the positioning of the orifices 141 in vertical alinement with the seats 41.

The disks 133 are rotated in synchronism with the tables 43, 44 so that the successive orifices 141 of said disks will register with the successive closure cap supporting seats 41. Rotation is imparted to the disks by the shaft 79 through a gear 146 fixed on the upper end portion of each shaft 134 extending from the sleeve 136 and meshing with a pinion 147 rotatably mounted in bearings in a housing 148 mounted on the beam 50 relative to each of the brackets 139. The pinions 147 mesh with a pinion 149 fixed on a stud shaft 150 rotatably supported in each of the housings 148 and carries a bevelled gear 151 exteriorly of the housings meshing with a bevelled pinion 152 fixed on the shaft 79, as shown in Figure 11.

The sealing pads positioned in registry with the orifices 141 of the disks 133 are engaged in the closure caps supported by the seats 41 positioned in vertical alinement with the orifices 141 having sealing pads registering therewith, by a plunger of a series of plungers 153 slidably supported by a carriage rotatable with each of the disks 133 and comprising a hollow conical member 154 rotatably supported on the lower portion of each of the sleeves 136 and fixedly connected to each of the hubs of the disks 133 by a key, as shown at 155 in Figure 11. An annular flange 156 extending laterally from the lower portion of each of said members 154 is arranged with a series of openings corresponding with the orifices 141 in the disks 133 and slidably supporting the lower portions of the plungers 153. The upper portions of the plungers 153 are supported and guided by a series of openings 157 corresponding to the openings in the flanges 156 and the orifices 141, arranged in an annular member 158 engaged on a shoulder arranged on each of the conical members 154, as at 159, and fixed to said conical members by a key, as at 160, so that the members 158 will rotate with the conical members 154 and the disks 133. The plungers 153 are yieldingly urged to position with the lower ends thereof extending through the openings in the flanges 156 and disks 133 and in the closure caps supported by the tables 43, 44 by a spring 161 coiled around each of the plungers and compressed between the under face of the annular members 158 and the opposite ends of pins 162 engaged in and projecting laterally from the plungers 153 adjacent the lower ends thereof. To permit the registering of the sealing pads with the orifices 141 by the ribs 142 and arcuate ridges 132, the lower ends of the plungers 153 are maintained in spaced relation to the orifices 141 in the disks 133 by a cam comprising an annular member 163 having an arcuate shaped recess or indent in the upper edge thereof, as at 164 in Figure 12, and supported from each of the conical members 154 with the indents 164 in position over that portion of the travel of the disks 133 at which the orifices 141 are in vertical alinement with the closure cap supporting seats 41, by angular member 165 having an opening in an angle portion to engage each of the tubular members 136 and the other angle portions extending parallelly of the plungers 153 and connected to the annular members 163, as by a screw as shown at 166 in Figure 11, and by a pair of angle brackets 167 mounted on a transverse member 168 of a member of a split collar 169 engaged on and clamped to each of the tubular members 136 below the angular member 165, as by bolts as indicated at 170 in Figure 10, and retained against rotation by a keyed connection with said tubular members, as at 171 in Figure 11. The angular members 165 are retained against rotation by extending the keyed connections 171 of collars 169 with the sleeves 136 and connecting said members to the collars 169, as by a screw as shown at 172 in Figure 11. The straight upper edge portions of the annular members 163 are adapted to support the plungers 153 in position above the disks 133 by engaging a roller 173 rotatably mounted on a headed pin 174 fixed in and projecting laterally from a flat face of a pair of opposed flat face portions arranged at the upper end of each of the plungers 153, as at 175. By the rotation of the conical members 154 imparted thereto by the shafts 134 through the disks 133, the rollers 173 will successively engage the arcuate indents 164 and permit the plungers to deliver the sealing pads from orifices 141 in disks 133 and engage the sealing pads in the closure caps in contact with the viscous adhesive therein, as shown at the right in Figure 11. The indents 164 are of such depth to permit the plungers to travel a distance sufficient to engage the sealing pads in contact with the adhesive but not to force the closure caps from the seats 41. The rollers 173 are maintained in contact with the annular members 163 by preventing the plungers turning in the annular members 158 and flanges 156 by engaging the flat face 175 opposite the flat face carrying the rollers 173 of each plunger with a slideway of a series of slideways 176 mounted in the upper end of an annular member 177 screw threaded onto the upper end of each of the conical members 154 and separated from the annular members 158 by annular shims having the peripheral portions engaging the flat faces of the plungers, as at 178 in Figure 11. The plungers are only momentarily in sealing pad engaging position as the lengths of the indents 164 are comparatively short relative to the circumference of the annular members 163, so that the continuous travel of the tables 43, 44 is not interrupted and the closure caps with the sealing pads in contact with the adhesive in said closure caps are transported by the tables 43, 44 away from the disks 133.

If there are no closure caps in the seats 41 of the tables 43, 44 positioned in vertical alinement with the orifices 141 of the disks 133, means are provided to prevent the feeding and registering of sealing pads in said orifices which will be positioned in vertical alinement with the seats 41 having no closure caps therein, thereby preventing waste of sealing pads. Said means comprises a lever 179 pivotally mounted on a plate 180 supported by each of the plates 130, as at 181, Figures 1, 10 and 13, and an arm of each of the levers 179 extending adjacent to said plates 130 and arranged with a blade portion 182 extending between the plates 130 and the disks 133 and normally positioned below the lower ends of the tubes 129 to engage the lowermost sealing pads in said tubes by a spring 183 attached at one end to the arm of each lever having the blade 182 and the opposite end attached to the plates 180, as shown in Figure 10. To move the blade portions 182 from the normal position shown in full lines in Figure 10 to position out of the path of discharge of sealing pads from the tubes 129, as shown in dot and dash lines in said Figure 10, there are provided means comprising a block 184 slidably mounted in a plate 185 mounted on each of the guide rails 96 adjacent to the plates 130 to position the blocks 184 relative to the closure cap supporting seats 41 that will be positioned in vertical alinement with the orifices 141 positioned to receive the lowermost sealing pads from the tubes 129. The blocks 184 are urged in position to engage closure caps in the seats 41 under the influence of the springs 183 by link connections having one link member 186 pivotally connected to the arm of each lever 179 opposite the arm having the blade 182 and a link member 187 pivotally mounted at one end on the plate 130, as at 188, with the opposite end pivotally connected to the link member 186 and having a slot intermediate the ends engaging a pin fixed in and extending upwardly from each of the blocks 184, as shown at 189 in Figures 1 and 10, whereby by the engagement of the blocks 184 by a closure cap during the travel of the tables 43, 44, as shown in dot and dash lines in Figure 10, will actuate the link connections 186, 187 to position the blades 182 out of the path of discharge of the sealing pads from the tubes 129, as shown in full lines in Figure 1 and in dot and dash lines in Figure 10.

After the sealing pads P are engaged in the closure caps C in contact with the adhesive therein, said closure caps are transported continuously from the disks 133 by the tables 43, 44 relative to means to remove the closure caps from said tables and apply pressure to the sealing pads while the closure caps, adhesive and the sealing pads are subjected to heat. Said means comprises a table 190 having a hub portion fixed on a shaft 191 rotatably mounted at one end portion in a bearing boss 192 arranged on the beam 50 in alinement with and intermediate the bearings 49 for the shafts 47 of the tables 43, 44 and the opposite end of the shaft 191 being rotatably mounted in a bearing 193 supported on the table T and having a circular recess in the upper end thereof for the engagement of the hub of the table 190 with an interposed antifriction bearing, as at 194 in Figures 2, 3 and 16. The bearings 192, 193 for the shaft 191 of the table 190 are positioned on the beam 50 and table T, respectively, at a point nearer the bearings 49, 48 for the shaft 47 of the table 44 than the bearings 49, 48 for the shaft 47 of the table 43, so that the peripheral portion of the table 190 will extend a greater distance relative to the peripheral portion of the table 44 than said peripheral portion of the table 190 will extend relative to the peripheral portion of the table 43, as shown in Figure 1. The table 190 is supported by the bearing 193 to position said table in substantially the horizontal plane of the table 43 which is in a higher plane than the horizontal plane of the table 44, so that the peripheral portion of the table 190 will extend above the peripheral portion of the table 44. The peripheral portion of the table 190 is arranged with an annular recess of angular form in cross section to form a shelf 195 which is adapted to intersect and extend below the closure cap supporting seats 41 of the table 43 and engage the closure caps supported in said seats adjacent to and on the longitudinal axis of the table T, and after sealing pads have been engaged in the closure caps in contact with the viscous adhesive therein. The closure caps engaged by the shelf 195 are removed from the seats 41 and retained on the shelf 195 by a series of plungers 196 slidably mounted in equidistantly spaced relation to each other and corresponding to the spacing of the seats 41 of the table 43 by a pair of alined spaced annular members 197, 198 supported and carried by the table 190 by mounting the member 198 on an annular portion of the table 190 adjacent the inner edge of the shelf 195, as at 199, and the member 197 being supported in spaced relation above the member 198 by spacers in the form of posts 200 fixed at the lower ends in the member 198 and the upper ends releasably engaged in openings in the member 197, as shown in Figures 2 and 3. The diameters of the annular members 197 and 198 are equal and of such extent to position the peripheral portions thereof above the shelf 195 with the member 198 forming with the shelf 195 an annular recess of greater height than the height of the closure caps. The plungers 196 are yieldingly urged in a downward direction toward the shelf 195 by springs 201 coiled around the plungers and compressed between the annular member 197 and the projecting ends of pins 202 engaged in the plungers to extend transversely thereof. Prior to the travel of the table 190 relative to the seats 41 of the table 43, the plungers 196 are actuated to position the lower ends thereof out of the annular recess formed by the annular member 198 and shelf 195 to permit the closure caps to be removed from and engaged on the shelf 195. This actuation of the plungers is accomplished by an arcuate rail 203 supported by the beam 50, as at 204 in Figure 2. The end portion of the rail which is forward relative to the rotation of the table 190 is of cam formation, as indicated at 205 in Figure 1, to engage rollers 206 rotatably mounted on pins 207 fixed in and extending laterally from the upper end portions of the plungers 196 and gradually move said plungers upward. The portion of the rail 203 succeeding the cam portion 205 extends in a higher horizontal plane to position the lower end portions of the plungers within the openings in the annular member 198, as at 208 at the right of Figure 14, and subsequent to the point where the seats 41 of the table 43 extend over the shelf 195, the rail 203 is reduced in thickness, as at 209, which reduced portion permits the plungers to move under the force of the springs 201 toward the shelf 195 and position the lower ends of the plungers within the closure caps carried in the seats 41 of the table 43 and positioned on the shelf 195 but not in engagement with the sealing pads in said closure caps, so that the closure caps may have rotary movement about the plungers to facilitate the removing of the closure caps from the seats 41 without marring the finish or decorations of the closure caps. The reduced portion 209 of the rail 203 terminates at a point subsequent to the removal of the closure caps from the seats 41 of the table 43 by the plungers to permit the plungers to engage and apply pressure to the sealing pads during the travel of the plungers with the table 190 from the terminating end of the rail 203 to the cam end 205 thereof where the plungers are removed from the closure caps by said cam end and the closure caps with intimate adhering sealing pads are removed from the shelf by an abutment plate 210 mounted on the guide rail 96 extending around the table 43 to extend above the shelf 195 and intersect the path of travel of the closure caps thereon.

To facilitate the intimate adhesion between the sealing pads and the closure caps supported by the shelf 195, the shelf is heated for a distance extending from the point where the table 43 intersects the table 190 to adjacent the point where the table 190 intersects the table 44. The means for heating the shelf 195 is shown as a gas burner in the form of a pipe 211 extending in an arcuate path below the shelf 195 connected in communication with the gas supply pipe 118, as at 212, and having discharge orifices therein to direct the gas flame against the under face of the shelf 195. The burner pipe 211 is supported from the table T by brackets 213 mounted on the table T and having a saddle portion at the upper end for the engagement of the pipe 211 and a clamping screw to releasably secure the pipe on said saddle portion, as shown at 214 in Figure 2.

The closure caps having sealing pads engaged therein in contact with the adhesive therein and supported in the seats 41 of the table 44, are positioned by the rotation of the table 44 above a shelf 215 extending laterally from the periphery of an annular member 216 adapted to be mounted on the under surface of the table 190 directly below the inner edge of the annular member 198 supporting the plungers 196, with the shelf 215 in parallel spaced relation with the under surface of the table 190 and of less diameter than the diameter of the shelf 195 to engage the closure caps in the seats 41 where the table 44 intersects the table 190. A series of plungers 217 are slidably mounted in the annular members 197, 198 in radial alinement with the plungers 196 and intermediate said plungers 196 and the shaft 191 with the lower end portions of the plungers 217 slidable in perforations in the table 190 in vertical alinement with the shelf 215, as at 218. The lengths of the plungers 217 are greater than the lengths of the plungers 196 so that the opposite end portions of said plungers 217 extend beyond the end portions of the plungers 196, as shown in Figures 2 and 3. The plungers 217 are urged in a direction toward the shelf 215 by springs 219 coiled around the plungers and compressed between the under surface of the annular member 197 and the projecting ends of pins 220 engaged in the plungers to extend transversely thereof. The plungers 217 are adapted to be lifted against the force of the springs 219 and be positioned in spaced relation to the shelf 215 and out of the path of travel of the seats 41 of the table 44, at a point in the travel of the table 190 preceding the point of intersection between the table 44 and table 190 by rollers 221 rotatably mounted on pins 222 fixed in and extending laterally from the upper end portions of the plungers 217 extending above the upper end portions of the plungers 196 to permit the rollers 221 to engage a cam portion 223 at one end of an arcuate rail 224 supported at the opposite end on the beam 50, as at 225 in Figure 3. By the rotation of the table 190 the rollers 221 are successively engaged with a horizontal portion 226 of the rail 224 extending from the cam portion 223 to the point of intersection between the shelf 215 and the seats 41 of the table 44 to position the lower ends of the plungers 217 within the perforations 218 of the table 190 and permit the closure caps having sealing pads therein to be positioned on the shelf 215 by the seats 41 of the table 44 in vertical alinement with the plungers 217. At the point of intersection between the tables 44 and 190, the rollers 221 travel down an inclined portion in the rail 224, as at 227 in Figure 17, onto a horizontal portion extending in a horizontal plane below the plane of the portion 226, as at 228, whereby the lower ends of the plungers 217 engage the inner circumference of the skirt portions of the closure caps. The travel of the table 190 with the plungers 217 in the latter position will remove the closure caps from the seats 41 of the table 44 and retain said closure caps on the shelf 215 without marring the finish of or decorations on the closure caps. The rail 224 terminates at a point in the travel of the table 190 where the closure caps are fully disengaged from the seats 41 of the table 44 to permit the plungers 217 to be moved by the force of the springs 219 into engagement with the sealing pads in the closure caps on the shelf 215 in which position the plungers remain until the rollers 221 are again engaged by the cam portion 223 of the rail 224, so that the sealing pads are placed under pressure in contact with the viscous adhesive in the closure caps for the greater part of a revolution of a table 190. To effect intimate adhesion between the sealing pads and closure caps, the shelf 215 is heated by suitable heating means shown in the present instance as a gas heater comprising an arcuate extending pipe 229 mounted on the table T by brackets 230 fixed to the upper surface of the table and arranged with a clamping screw, as at 231 in Figure 3, to retain the burner pipe in alinement below the shelf 215 and direct the gas flame against the under surface of said shelf. The burner pipe 229 is connected at one end in communication with the gas supply pipe 118, as at 232 in Figures 1 and 2, and the opposite end terminates at a point adjacent the point of intersection between the shelf 215 and the seats 41 of the table 44. The plungers 196 and 217 are guided to travel in vertical paths by an annular plate 232' mounted on the annular member 197 between the annular rows of plungers to engage flat face portions of said plungers at the upper ends thereof, as shown in Figures 2 and 3.

The tables 43, 44 and 190 are rotated in synchronism with each other from the drive shaft 18 through a shaft 233 rotatably mounted at the opposite end portions in bearings 234 mounted on the outer face of the standard S' supporting the drive shaft 18 to support the shaft 233 in vertical alinement with the shafts 47 and 191. The shaft 233 is operatively connected to the drive shaft by a bevelled pinion fixed on the upper end of the shaft 233 meshing with a bevelled pinion fixed to the drive shaft 18, as at 235 in Figures 2 and 4, and the rotation of the shaft 233 is imparted to the table 43 by a pinion 236 fixed on the lower end of said shaft meshing with a gear 237 fixed on a stud shaft 238 rotatably mounted in a bearing supported by the table T, as at 239 in Figure 2. A pinion 240 is fixed on the stud shaft 238 meshing with a gear 241 fixed on the lower end portion of the shaft 47 supporting the table 43 which meshes with a gear 242 fixed on the lower end portion of the shaft 191, whereby rotation is imparted to the tables 43 and 190 in opposite directions, the table 43 being rotated in anti-clockwise direction and the table 190 in clockwise direction, as indicated by the arrows in Figure 1. The table 44 is rotated in the same direction as the table 43 by the table 190 through a gear 243 fixed on the hub portion of the gear 242, as at 244 in Figures 2 and 3, and meshing with a gear 245 fixed on the lower end portion of the shaft 47 supporting the table 44.

The disks 34 are rotated continuously in a clockwise direction by the table 190 through pinions 246 rotatably mounted in bearings 247 supported from the table T at diametrically opposite points of the periphery of the table 190 and meshing with diametrically opposite portions of the gear 242 and a pinion 248 fixed on each of the shafts 35 of the disks 34, as shown in Figures 2, 5 and 6, so that the disks 34 will transfer the closure caps from the chutes 32 to the seats 41 of the tables 43, 44, and said tables will transport the closure caps from the disks 34.

To prevent injury to the operator and accumulation of foreign substances, the pinions 82, 83 and 235 and shaft 233 are enclosed in the standards S' by a cover plate 249 releasably mounted on said standard, as shown in Figure 2.

The table 44 and its associated disk 133 are of slightly greater diameter than the diameter of the table 43 and its associated disk 133 due to the fact that shelf 215 is of less diameter than the shelf 195 and the plungers 217 are closer together than the plungers 196. The greater diameter of the disk 133 which is associated with the table 44 requires a gear 146 of greater diameter than the diameter of the gear 146 connected to the disk 133 associated with the table 43, as shown in Figure 1. It also follows that there are a greater number of seats 41 in the table 44 and a greater number of orifices 141 and plungers 153 for the disk 133 associated with the table 44.

The closure caps having intimately adhering sealing pads therein on the shelf 215 from which the plungers 217 have been released by the rail 224, are removed from the shelf 215 by an abutment plate 250 which is similar to the abutment plate 210 and mounted on the guide rail 96 extending around the table 44 to extend over the shelf 215 and engage and guide said closure caps from the shelf by the rotation thereof. The abutment plates 210, 250 guide the closure caps from the shelves 195, 215, respectively, onto chutes 251 mounted on the table T at diametrically opposite points of the peripheries of the shelves 195, 215, with the upper end of one of said chutes arranged in front of the abutment plate 210 to receive closure caps from the shelf 195 and the upper end of the other chute being arranged in front of the abutment plate 250 to receive closure caps from the shelf 215, as clearly shown in Figure 15. The lower ends of the chutes terminate relative to a shelf 252 arranged on the peripheral portion of an annular member 253 suspended from the table 190 by spacer members 254 having a stud portion at the upper ends engaged in the annular members 198, 216 and the table 190 and the spacing portions separating the annular member 253 from the annular member 216, so that the members 198, 216 are secured to the table 190, as at 255 in Figures 2, 3 and 16, and the shelf 252 is positioned in spaced relation below the shelves 195, 215, as shown in Figure 16. The chutes 251 are mounted relative to the shelf 252 to direct the closure caps from the shelf 195 onto the outer edge portion of the shelf 252 and direct the closure caps from the shelf 215 to the inner edge portion of the shelf 252, so that the closure caps will be transported in a double row by the shelf 252 through the rotation of the table 190. During the travel of the closure caps on the shelf 252, each row of closure caps will be positioned in separate parallel channels extending above and from the shelf 252 and formed by three parallel walls or rails 256 secured at the upper edges to a plate 257 extending in parallel spaced relation to the shelf 252. The ends of the two inner walls 256 are bevelled, as at 258 in Figure 15, to facilitate maintaining the closure caps in separate rows and the outer wall 256 is extended in an arcuate direction relative to the periphery of the shelf 252, as at 259, to maintain the outer row of closure caps on the shelf 252. The walls 256 extend from the shelf 252 to and over the peripheral portion of a circular table 260 having a tubular hub member 261 rotatably mounted in a boss 262 arranged in one end of an arm 263 fixed at the other end to the side of the table T in alinement with the shaft 191, as at 264 in Figure 15. The periphery of the table 260 is adjacent to the periphery of the shelf 252 to form a continuous support for the closure caps, and the table 260 is rotated in a direction opposite to the direction of rotation of the shelf 252 which is the same as the table 190, so that closure caps will travel from the shelf 252 to the table 260 under the guidance of the walls 256. The table 260 is rotated continuously from the table 190 through a train of gears 265 rotatably mounted in bearings on the under face of the arm 263, as at 266 in Figure 16, with one of the gears of said train meshing with the gear 242 and the other gear of said train meshing with an annular gear 267 fixed to the tubular hub 261. The closure caps positioned on the table 260 are guided by the walls 256 relative to a pair of channels extending in a spiral or cochleary path from the periphery of said table 260 to the opening in the tubular hub portion 261 which constitutes a discharge opening or chute. The cochleary channels are formed by a pair of strips 268, 269 of flexible material, such as spring steel, supported at the upper edges by a pair of cross members 270 fixed at the opposite ends to arms 271 fixed to and extending radially from the boss 262 with the free ends positioned beyond the periphery of the table 260 and arranged with bosses projecting above the upper face of said table for the mounting of the members 270 thereon, as at 272 in Figure 16. The members 270 are spaced above the upper face of the table 260 and the strips 268, 269 are of such width to position the lower edges of said strips in spaced relation to the upper face of the table 260. The outer ends of the strips 268, 269 are secured to the two inner walls 256, as at 273 in Figure 15, and the inner ends of said strips terminate at diametrically opposite portions of the discharge opening in the tubular hub portion 261 to direct the closure caps in two parallel cochleary rows from the channels formed by the walls 256 toward and into the discharge opening. The closure caps entering the discharge opening in the hub 261 drop into a suitable depository positioned below said opening, not shown. The plate 257 supporting the walls 256 is supported in position by a member 274 fixed at the opposite ends on the bosses 272 of the arms 271 extending from the boss 262 toward the shelf 252.

The different operating devices of the apparatus may be adjusted or positioned by a hand wheel 275 fixed on the end portion of the drive shaft 18 opposite the end portion arranged with the clutch 22, whereby the shafts 97 and 233 are rotated by hand when the drive shaft is disconnected from the source of power.

Having thus described my invention, I claim:

1. In apparatus for assembling sealing pads in closure caps, a series of means mounted in spaced relation to each other and each of said means adapted to releasably support and transport closure caps, means mounted relative to the path of travel of each closure cap transporting means to successively engage closure caps on said transporting means, deposit and spread a spot of adhesive in the closure caps on the transporting means, heat the closure caps and adhesive to render the adhesive viscous, and engage sealing pads in the closure caps in contact with the viscous adhesive while the closure caps are solely supported by the closure cap transporting means, and pressure applying means mounted between the closure cap transporting means adapted to engage and transfer thereto the closure caps having the sealing pads engaged therein from the closure cap transporting means and apply pressure to the sealing pads to effect an intimate adhesion between the sealing pads and closure caps.

2. In apparatus for assembling sealing pads in closure caps, a series of continuously traveling means spaced from each other and arranged to support closure caps, means mounted relative to each closure cap supporting means to feed and engage closure caps onto said supporting means, means mounted relative to the path of travel of each closure cap supporting means in sequence to the engagement of the closure caps on said supporting means to deposit adhesive in the closure caps, means extending relative to the path of travel of each closure cap supporting means in sequence to the depositing of adhesive to heat the closure caps to render the adhesive viscous, means traveling relative to a portion of the path of travel of each closure cap supporting means in sequence to the heating of the closure caps adapted to transport sealing pads to position in superposed alinement with the heated closure caps on each supporting means and engage the alined sealing pads in said heated closure caps in contact with the viscous adhesive, pressure applying means continuously traveling between the series of closure cap supporting means at the portions of the path of travel of said closure cap supporting means in sequence to the engagement of the sealing pads in the closure caps on the supporting means, adapted to transfer to said pressure applying means the closure caps having sealing pads engaged therein from the closure cap supporting means and apply pressure to the sealing pads to effect an intimate adhesion between the sealing pads and closure caps, means arranged below and traveling with the pressure applying means to receive the closure caps from the pressure applying means, and means traveling continuously adjacent to the closure cap receiving means and adapted to receive the closure caps from the closure cap receiving means to transport said closure caps from the apparatus.

3. In apparatus for assembling sealing pads in closure caps, means to engage sealing pads in closure caps, means to apply pressure to the sealing pads in the closure caps, and means to discharge closure caps having sealing pads assembled therein from the pressure applying means comprising a continuously rotating table mounted with a peripheral portion juxtaposed to the pressure applying means to receive the assembled closure caps from said pressure applying means and having an axial discharge opening, and means arranged above the upper surface of the table to direct the closure caps transported by said table into the discharge opening.

4. Apparatus for assembling sealing pads in closure caps as claimed in claim 3, wherein the means to direct closure caps into the discharge opening of the continuously rotating table, comprises stationary members forming a cochleary channel above the table extending from the peripheral portion of the table juxtaposed to the pressure applying means to the axial discharge opening.

5. In apparatus for assembling sealing pads in closure caps, a continuously traveling circular table having a series of recesses around the periphery thereof to releasably support closure caps, and means to feed and engage closure caps in the successive recesses of the table, comprising a continuously rotating disk adapted to support closure caps on the upper surface in the plane of travel of the table recesses with a peripheral portion of said disk extending below the recesses, a channel member mounted above the upper surface of the disk extending from a source of supply of closure caps to adjacent the peripheral portion of the disk extending below the recesses and in which channel the closure caps on the disk are caused to travel by the rotation of the disk, and an arm pivotally mounted at the terminus of a side wall of the channel member yieldingly urged toward the table recesses to guide the closure caps in the channel member into the recesses and adapted to be moved in a direction away from the recesses by an excessive number of closure caps positioned on the disk relative to the recesses to permit transporting of said excessive closure caps from the table recesses by the disk.

6. In apparatus for assembling sealing pads in closure caps, a conveyer arranged to support closure caps, adhesive applying means operative to intermittently engage the closure caps on the conveyer and deposit a spot of adhesive in said closure caps by said engagement, a heating element extending parallelly of the path of travel of the closure caps on the conveyer in sequence to the adhesive applying means to render the adhesive viscous in the closure caps, and means to simultaneously control the actuation of the adhesive applying means and the heating element whereby the shutting off of the heating element from its source of heat supply will retain the adhesive applying means out of engagement with the closure caps.

7. In apparatus for assembling sealing pads in closure caps, a continuously traveling conveyer arranged to releasably support a series of closure caps, and means to transport sealing pads to position in vertical alinement with the closure caps on the conveyer and engage the alined sealing pads in the closure caps, comprising a continuously rotating disk having a series of orifices intermediate the center and periphery of the disk and a series of ribs on the upper face of the disk extending from the orifices to the periphery of the disk, the disk being mounted to position the orifices successively in vertical alinement with successive closure caps on the conveyer, a cam mounted above the ribs and extending from the periphery of the disk to a point in the path of travel of the orifices to progressively move the sealing pads in conjunction with the ribs toward the orifices and position the sealing pads in registry with the orifices prior to the positioning of the orifices in vertical alinement with the closure caps on the conveyer, and means to engage the sealing pads in registry with the orifices in vertical alinement with the closure caps on the conveyer and position said sealing pads in the closure caps.

8. In apparatus for assembling sealing pads in closure caps, a continuously traveling conveyer arranged to support a series of closure caps, means to support sealing pads in stack formation, means to transfer sealing pads from the pad supporting means to position in vertical alinement with the closure caps on the conveyer, comprising a continuously rotating disk having an annular series of orifices intermediate the center and periphery of the disk and said disk being mounted to position a peripheral portion below the sealing pad supporting means to receive the lowermost sealing pad and to position the orifices successively in vertical alinement with the closure caps on the conveyer, and means to progressively move the sealing pads through the rotation of the disk from the sealing pad supporting means into registry with the orifices prior to the positioning of the orifices in vertical alinement with the closure caps on the conveyer, and means to transfer the sealing pad in registry with an orifice in vertical alinement with a closure cap on the conveyer from the disk to said closure cap.

9. In apparatus for assembling sealing pads in closure caps as claimed in claim 8, a pivoted lever normally positioned with one end in engagement with the lowermost sealing pad in the sealing pad support to prevent the feeding of sealing pads to the disk and arranged to be actuated by the travel of closure caps toward the position to receive sealing pads from the disk, said actuation of the lever positioning said end of the lever out of engagement with the lowermost sealing pad and permitting said pad to engage the disk.

10. Apparatus for assembling sealing pads in closure caps as claimed in claim 8, wherein the means to progressively move sealing pads from the sealing pad supporting means into registry with the disk orifices, comprises an abutment on the face of the disk relative to each orifice and a member having a cam face extending from the sealing pad support to a point in the path of travel of the orifices in advance of the point of tangency of the path of travel of the orifices and of the path of travel of the closure caps on the conveyer.

11. Apparatus for assembling sealing pads in closure caps as claimed in claim 8, wherein the means to transfer the sealing pads from the disk to the closure caps, comprises a series of plungers adapted to travel with the disk and each plunger slidably mounted to have movement toward and away from a disk orifice and yieldingly urged toward said disk to transfer sealing pads in registry with the disk orifices from the disk to the closure caps, and means arranged to retain the plungers in spaced relation to the orifices for the greater part of a revolution of the disk and release the plungers to have movement toward the orifices at the position of the orifices in vertical alinement with closure caps on the conveyer.

12. In apparatus for assembling sealing pads in closure caps, a conveyer arranged to support and transport a series of closure caps, adhesive applying means movable toward and away from the closure caps on the conveyer adapted to deposit adhesive in said closure caps by contact with the closure caps, a gas heating element extending parallelly of the path of travel of the closure caps on the conveyer arranged in sequence to the adhesive applying means relative to the path of travel of the conveyer to heat the closure caps and render the adhesive therein viscous, means to control the supply of gas to the heating element, a drive shaft operatively connected to the conveyer and adhesive applying means to actuate said conveyer and adhesive applying means, means to operatively connect and disconnect the shaft to a source of power, and means operatively connected to the means to control the supply of gas to the heating element and the means for connecting the shaft to a source of power and adapted to actuate said connected means simultaneously.

13. In apparatus for assembling sealing pads in closure caps, a pair of tables arranged around the peripheries thereof with an annular series of seats to releasably support closure caps and rotatably supported in spaced relation to each other and extending in different horizontal planes, means arranged successively around the periphery of each table to engage closure caps in the seats, deposit adhesive in the closure caps in said seats, heat the closure caps and render the adhesive viscous, and engage sealing pads in the closure caps in contact with the viscous adhesive, and pressure applying means comprising a table rotatably mounted between the pair of tables arranged with a pair of annular shelves at the periphery thereof with a peripheral portion of one shelf extending below and intersecting the seats at a peripheral portion of one of the pair of tables and a peripheral portion of the other shelf extending below and intersecting the seats at a peripheral portion of the other table of said pair of tables to engage closure caps having sealing pads therein in the seats of the pair of tables, and an annular series of pressure applying plungers carried by the shelf carrying table relative to each shelf to have reciprocatory movement toward and away from the shelves and adapted to engage the closure caps engaged by the shelves and transfer said closure caps from the seats of the pair of tables to the shelves and place the sealing pads under pressure in the closure caps on the shelves to effect an intimate adhesion between the sealing pads and closure caps.

14. In apparatus for assembling sealing pads in closure caps as claimed in claim 13, an annular shelf carried by the table arranged with the pair of shelves and extending below said shelves, means to actuate the plungers out of engagement with and release the closure caps on said pair of shelves, and means to engage the closure caps having intimately adhering sealing pads released from the plungers on the pair of shelves by the rotation of said shelves and direct said closure caps to the annular shelf below the pair of shelves.

15. In apparatus for assembling sealing pads in closure caps, a continuously rotating circular table having an annular series of seats to releasably support closure caps, means arranged relative to the path of travel of the table seats to successively engage closure caps in said seats, deposit adhesive in the closure caps in the seats, heat the closure caps in the seats and render the adhesive viscous, and engage sealing pads in the closure caps supported solely by the table with the sealing pads in contact with the viscous adhesive, a second continuously rotating circular table having a peripheral shelf portion extending below the seats of the first table supporting closure caps having sealing pads therein, a series of pressure applying plungers slidably supported by the second table to have movement toward and away from the shelf portion of said table, and means to actuate the plungers successively away from the shelf to permit passage of the shelf below the seats of the first table, then move the plungers to engage the skirt portions of the closure caps positioned relative to the shelf to transfer the closure caps from the seats of the first table and loosely retain said closure caps on the shelf of the second table, and then forcibly engage the sealing pads in the closure caps transferred from the seats of the first table to and supported by the shelf of the second table to effect an intimate adhesion between the sealing pads and closure caps.

16. In apparatus for applying pressure to sealing pads in closure caps, a rotatable table having a series of annular shelves, an annular series of spring influenced plungers arranged relative to each shelf to have movement toward and away from the shelves and normally urged toward the shelves, means to move the plungers away from the shelves at predetermined points in the rotation thereof, and means spaced from each other to deliver closure caps having sealing pads therein to each shelf relative to plungers moved away from the shelves.

17. In apparatus for applying pressure to sealing pads in closure caps, a pair of traveling shelves extending in different horizontal planes, a series of spring influenced plungers slidably mounted relative to each shelf to have movement toward and away from the shelves and urged in a direction toward said shelves, means mounted relative to each series of plungers to actuate said plungers against the force of the springs in position spaced from said shelves, and means traveling adjacent to each plunger actuating means to position closure caps having sealing pads therein on the portions of the shelves, from which portions the plungers are moved away by the actuating means.

18. In means for assembling sealing pads in closure caps, a rotatable table having a series of concentric peripheral shelves arranged in different planes, an annular series of plungers carried by the table relative to each shelf to have movement toward and away from and normally urged into engagement with the shelves, means disposed relative to a predetermined portion of the path of travel of each annular series of plungers to actuate the plungers away from the shelves and retain them in said position, means to assemble sealing pads in closure caps disposed relative to each shelf and adapted to position closure caps with sealing pads assembled therein on the portion of each shelf, from which portion the associated plungers are moved away by the actuating means, and the plungers in their movement toward the shelf adapted to transfer said closure caps from the means to assemble sealing pads therein to its associated shelf and place the sealing pads under pressure, and means positioned relative to the portion of each shelf at which the plungers are actuated away from the shelf to engage and deliver from the shelves by the travel of the table closure caps having the sealing pads which have been subjected to the pressure of the plungers.

19. In means for assembling sealing pads in closure caps as claimed in claim 18, wherein the means to deliver the closure caps from the shelves are arranged to deliver the closure caps therefrom in parallel rows, a table rotatable in a plane below the shelves adapted to receive the closure caps delivered from the shelves in parallel rows.

20. In means for assembling sealing pads in closure caps as claimed in claim 18, wherein the means for delivering the closure caps from the shelves are arranged to deliver the closure caps therefrom in parallel rows, a table rotatable in a plane below the shelves adapted to receive the closure caps delivered from the shelves in parallel rows and having an opening axially thereof, and means disposed relative to the face of said latter table to cause the closure caps delivered thereto to travel by the rotation of the table in cochleary paths toward the center of the table and deliver the closure caps from the table into the opening axially therein.

21. In apparatus for assembling sealing pads in closure caps, a series of means mounted in spaced relation to each other and each of said means adapted to releasably support and transport closure caps, means mounted relative to each of said closure cap transporting means adapted to transport sealing pads in registry with closure caps on the closure cap transporting means, means movable as a unit with the sealing pad transporting means and adapted to engage sealing pads into registering closure caps on the closure cap supporting means, and pressure applying means mounted between the closure cap transporting means adapted to engage and remove the closure caps having sealing pads therein from the closure cap transporting means and place the sealing pads in said closure caps under pressure.

JOHN A. JOHNSON.